(12) United States Patent
Subramanian et al.

(10) Patent No.: US 8,654,680 B2
(45) Date of Patent: Feb. 18, 2014

(54) PACKET FORWARDING USING MULTIPLE STACKED CHASSIS

(75) Inventors: Krishnamurthy Subramanian, Mountain View, CA (US); Raja Jayakumar, Fremont, CA (US); Pathangi Narasimhan Janardhanan, Channai (IN)

(73) Assignee: Force10 Networks, Inc., San Jose, CA (US)

( * ) Notice: Subject to any disclaimer, the term of this patent is extended or adjusted under 35 U.S.C. 154(b) by 212 days.

(21) Appl. No.: 12/839,557

(22) Filed: Jul. 20, 2010

(65) Prior Publication Data

US 2012/0020373 A1  Jan. 26, 2012
US 2012/0320929 A9  Dec. 20, 2012

Related U.S. Application Data

(60) Provisional application No. 61/314,212, filed on Mar. 16, 2010.

(51) Int. Cl.
*H04L 12/751* (2013.01)
*H04L 12/56* (2011.01)

(52) U.S. Cl.
CPC .................................. *H04L 45/08* (2013.01)
USPC ........... 370/255; 370/396; 370/389; 370/419; 370/464; 370/474

(58) Field of Classification Search
USPC .......................... 370/396, 389, 419, 464, 474
See application file for complete search history.

(56) References Cited

U.S. PATENT DOCUMENTS

| | | | |
|---|---|---|---|
| 6,504,842 B1 | 1/2003 | Bergenfeld | |
| 6,785,272 B1 * | 8/2004 | Sugihara | 370/386 |
| 7,680,107 B2 * | 3/2010 | Kalkunte | 370/389 |
| 8,139,492 B1 | 3/2012 | Peterson et al. | |
| 2002/0010791 A1 * | 1/2002 | Kalkunte et al. | 709/238 |
| 2005/0105560 A1 | 5/2005 | Mann et al. | |
| 2005/0135355 A1 * | 6/2005 | Muthukrishnan et al. | 370/389 |
| 2005/0265358 A1 * | 12/2005 | Mishra et al. | 370/400 |
| 2006/0036765 A1 * | 2/2006 | Weyman | 709/245 |
| 2006/0114876 A1 * | 6/2006 | Kalkunte | 370/341 |
| 2007/0121630 A1 | 5/2007 | Stephen et al. | |
| 2008/0049612 A1 * | 2/2008 | Oelgaard et al. | 370/229 |
| 2008/0151890 A1 * | 6/2008 | Zelig et al. | 370/390 |
| 2009/0135838 A1 * | 5/2009 | Rouyer et al. | 370/401 |
| 2009/0175281 A1 | 7/2009 | Higuchi et al. | |
| 2010/0182933 A1 * | 7/2010 | Hu et al. | 370/254 |
| 2010/0316055 A1 | 12/2010 | Belanger et al. | |
| 2011/0085569 A1 | 4/2011 | Gnanasekaran et al. | |

* cited by examiner

*Primary Examiner* — Dang Ton
*Assistant Examiner* — Robert M Morlan
(74) *Attorney, Agent, or Firm* — Haynes and Boone LLP

(57) ABSTRACT

A stacked chassis comprising multiple physical switch/router chassis operates without any special stacking hardware or stacking channels. Instead, a stacking LAG is installed between front-end switch ports on the stacked chassis. The chassis controllers negotiate a master, which controls operation of all chassis in the stack. A stacked-chassis-wide port numbering scheme is used to distribute information to all line cards in the system. Each line card processes the information to distill physical-chassis significant information for operation of that chassis in the stack.

18 Claims, 23 Drawing Sheets

PACKET FORWARDING USING MULTIPLE STACKED CHASSIS

CROSS-REFERENCES TO RELATED APPLICATIONS

This application claims priority to U.S. Provisional Application No. 61/314,212, filed Mar. 16, 2010.

BACKGROUND

1. Field of the Invention

The present disclosure relates generally to packet network devices such as switches and routers, and more particularly to methods for stacking multiple such devices to form a larger logical device.

2. Description of Related Art

Packet network devices direct data packets traveling across a network between data sources and destinations. Packet network devices can perform "routing" or "switching" depending on the header information and networking techniques used to direct the data packets. A single packet network device may be configured to perform both switching and routing. Such devices are referred to herein as a "packet switch" with the understanding that this term encompasses a wide variety of packet forwarding capabilities.

FIG. 1 shows a high-level block diagram for an exemplary modular packet switch 100. The switch comprises a chassis (not shown) with an electrical backplane 110, to which circuit cards mate in order to communicate with other cards in the chassis. In FIG. 1, the switch accommodates n line cards, LC1-LCn, m switch fabric cards, SFC1-SFCm, and two route processing managers RPM0, RPM1.

Each line card LCx (where x represents any of the line card slot positions 1 to n) receives ingress data traffic from and transmits egress data traffic to peer devices through its external ports to a port interface, PIx. Port interface PIx transmits and receives the physical layer signaling required by the external ports, performs framing, and communicates packet streams for each external port with a packet processor PPx. The ports can be configured for different electrical or optical media via the use of different line card types, different port interface modules, and/or different pluggable optics modules.

For most ingress packet traffic on each line card LCx, a line card packet processor PPx processes the packet, determines one or more switch egress ports for the packet, and queues the packet for transmission through the switch fabric when possible. For most egress packet traffic on each line card LCx, the line card queues the packets arriving from the switch fabric, and selects packets from the queues and serves them fairly to the egress ports. To accomplish these functions, PPx interfaces with a scheduler interface SCHx, a content-addressable memory CAMx, and a line card processor LCPx. PPx notifies scheduler interface SCHx as to the destination line cards for which it has packets queued, and receives switch fabric schedule information back from SCHx. PPx uses the scheduling information to place packets from one or more queues on the switch fabric backplane connections during each scheduling epoch. The switch fabric connections are implemented using unidirectional differential serial bus pairs, with each line card packet processor having at least one ingress pair for each switch fabric card and one egress pair for each switch fabric card. An intermediate serializer/deserializer ("serdes," not shown) may be used between PPx and the backplane differential serial pairs.

Memory CAMx stores lookup tables that PPx accesses to determine what operations to perform on each packet, as well as the next hop destination for each packet. PPx generally constructs one or more lookup keys from the headers and receive port information, etc., and performs one or more lookup operations on CAMx. CAMx returns pointers into instruction memory and next hop memory (not shown), as well as any parameters needed to process the packets.

Line card processor LCPx is a general purpose processor that handles control plane operations for the line card. Control plane operations include programming CAMx and lookup memory according to instructions from the master RPM, programming registers on PPx that tailor the line card behavior, receiving control plane packets (packets addressed to switch 100, e.g., for various routing/switching protocols) from PPx, and transmitting control plane packets (packets generated by switch 100 for communication to a peer device) to PPx for forwarding out an external port. LCPx may implement some control plane functionality for some protocols handled by switch 100.

LCPx also connects to the electrical backplane through a card management FPGA (Field Programmable Gate Array) FPGAx and an Ethernet switch ESWx. The card management FPGA connects through serial management bus interfaces on electrical backplane 110 to master card management FPGAs on the RPMs. The RPMs use the serial management bus to boot line cards, monitor the health of the line card and its environmental parameters, manage power for the line card and its components, and perform basic hardware configuration for the line card. Various registers on FPGAx are readable by line card processor LCPx, allowing LCPx to perform some of its configuration tasks using values stored in the registers by the RPMs.

Ethernet switch ESWx connects to two backplane Ethernet point-to-point links, one linking ESWx to each RPM. LCPx transmits control plane traffic, as well as line card statistics and monitored data plane traffic, to the master RPM using packets transmitted to ESWx. Likewise, the master RPM transmits FIB (Forwarding Information Base) updates and boot images to LCPx for consumption, and control plane packets destined for external peers to LCPx for forwarding to PP1.

Switch fabric card SFC1 is exemplary of the switch fabric cards, which are generally identical in a system. Switch fabric card SFC1 comprises a switch fabric device, SF1, a switch fabric scheduler interface SFSCH1, and a card management FPGA 1. Although FPGA 1 can be the same type of hardware device as FPGA 1 on line card LC1 and have the same RPM interface programming, its other programming is generally specific to the requirements of a switch fabric card. The scheduler interface SFSCH1 does not provide schedule information to each RPM, it merely receives the epoch schedules used to program the switch fabric for each epoch. The switch fabric cards work in parallel according to a common epoch schedule. Each epoch, every switch fabric card has a switch fabric SFy that is programmed the same way through the switch fabric scheduling interface SFSCHy.

The switch fabric SF1 provides serdes interfaces for each line card and a parallel crossbar switch that can switch any of the inputs to any number of the outputs. In one embodiment, the line cards slice up each packet sent to the switch fabric into lanes, sending one byte of the packet to SFC1, the next byte to SFC2, etc., in round-robin fashion on each lane. A receiving line card aligns the lanes incoming from the switch fabric cards and reassembles the packet data. This allows the switch to tolerate malfunctioning switch fabric cards by simply not sending data on a malfunctioning lane.

The route processing managers (RPMs) control all aspects of the overall operation of the chassis. RPM1 and RPM2 are identical, and the switch can run with only one RPM. When two RPMs are present, one is elected as the master, and the other remains on standby. The standby RPM monitors the health of the master, and takes over as master should the first fail. Each RPM RPMx comprises three processors: a control processor CPx, which controls the overall operation of the switch; and two route processors RPx.0, RPx.1, which run different routing/switching protocols, communicate with external peers, and program the line cards to perform correct routing and switching.

Each RPM RPMx also has three bus interfaces to the electrical backplane. A master Ethernet switch MESWx connects through backplane Ethernet links to each line card Ethernet switch, ESWy, and to the control processor and each route processor. A master scheduler MSCHx connects through the backplane scheduling bus to each line card and switch fabric card—the master scheduler determines from the line card requests a switch fabric schedule for each epoch, and communicates this schedule to the line cards and switch fabric cards. A master FPGA MFPGAx connects through backplane serial management bus connections to each other card in the chassis. The master FPGA monitors the health of each other card through heartbeat message exchanges and environmental data collections, and provides an interface for CPx to control the hardware on each card. In some hardware implementations, each RPM also has serdes interfaces to lanes on the switch fabric cards, and can receive and send packets to the line cards over the switch fabric.

As alluded to above, communications between the chassis modules uses four separate bus systems on electrical backplane 110. A packet data bus system connects the line cards and the switch fabric cards, allowing high-speed transfer of data traffic through the switch. Due to the high data rates of this bus and the fact that separate trace groups connect each of n line card slots to each of m switch fabric card slots, this is the largest bus system on the electrical backplane 110. A control plane packet data bus system allows the master routing/switching protocols running on the RPMs to communicate with each other, with the line cards, and with peer devices through the line card external ports. This packet data bus system may be, e.g., a point-to-point Ethernet link between each line card and each RPM card. A scheduling bus system allows the master RPM to coordinate and synchronize the internal transmission of packet data between the line cards and the switch fabric cards. This bus system is separated to preserve critical timing for the exchange of scheduling information between each line card and switch fabric card and each RPM. And a chassis management bus system allows the RPMs to monitor, configure, and manage the hardware on each line and switch fabric card. This bus system may use industry standard relatively low-speed serial management bus protocols, such as System Management Bus (SMBus), across point-to-point links between each line card or switch fabric card FPGA and each master FPGA.

BRIEF DESCRIPTION OF THE DRAWINGS

FIG. 4 illustrates interprocess communication between the stack master card and another card on the same physical chassis.

FIG. 5 illustrates interprocess communication between the stack master card and a stacking card on another physical chassis.

FIG. 6 illustrates interprocess communication between the stack master card and a non-stacking card on another physical chassis.

FIG. 7 illustrates forwarding of a control packet, received at a front end port of the stack master chassis, to the stack master card.

FIG. 8 illustrates forwarding of a control packet, received at a front end port on a non-stacking card on another physical chassis, to the stack master card.

FIG. 9 illustrates forwarding of a control packet from the stack master card to a front end port on a non-stacking card on another physical chassis.

FIG. 10 shows programming on each line card of each chassis of a MAC address learned on one port.

FIG. 11 shows same-chassis layer 2 forwarding of a packet with the learned MAC address.

FIG. 12 illustrates layer 2 forwarding of a packet with the learned MAC address received on the stacking card on the other physical chassis.

FIG. 13 illustrates layer 2 forwarding of a packet with the learned MAC address received on a non-stacking card on the other physical chassis.

FIG. 14 illustrates layer 2 flooding of a packet across all ports of a VLAN having member ports on both chassis.

FIG. 15 shows programming on each line card of each chassis for a LAG having ports on both physical chassis.

FIG. 16 illustrates forwarding of packets on both chassis that egress on the LAG set up of FIG. 15.

FIG. 17 illustrates layer 2 flooding of a packet across all ports of a VLAN that includes the LAG of FIG. 15.

FIG. 18 shows programming on each line card of each chassis for a layer 3 (IP) address.

FIG. 19 illustrates layer 3 forwarding of a packet, across both chassis, for the IP address set up in FIG. 18.

DETAILED DESCRIPTION

Single chassis packet switches can only support a limited number of line cards and ports. Some vendors provide special link cards or a "back-end" port that can be used to connect two separate switches together to form a system that in at least some ways acts with peer devices like a single larger chassis. With two chassis connected in this manner, when a packet arrives at one of the switches that must egress on the other switch, instead of processing the packet normally the first switch places the packet in a special proprietary wrapper and hands the packet off to the other switch using the proprietary connection. The second switch reads the wrapper, removes it, and processes the packet.

These prior art stacked systems possess a variety of limitations that hinder their usefulness. One limitation is that the proprietary stacked connections have an inherent bandwidth limit according to whatever accommodation is made on the special channel—thus such systems can be overwhelmed quickly when a significant portion of traffic starts to cross between chassis, causing large and/or erratic packet latency and/or dropping. Due to the dedicated nature of the connection, no flexibility exists in designing the inter-chassis bandwidth for a specific situation. Further, the special handling and wrappers require additional processing and can slow packet handling. Additionally, such designs can constrain the network administrator by not allowing some features (link aggregations, multicast groups, VLANs, etc.) to be "split" across two chassis. Another limitation in the prior art is that a failure of the stacking port/stacking module brings down the entire stacked system.

The embodiments described below take a novel approach by creating a single, logical chassis out of two fully functional physical chassis, linked only through their normal front-end traffic ports. A link aggregation group (LAG) with enough member ports to support anticipated cross-platform traffic is set up between the two chassis, and the RPMs on the two chassis negotiate to determine a stack master. The stack master configures the line cards on each chassis for appropriate behavior in each traffic situation, as will be described below. Such behavior generally using the same types of lookup and forwarding operations already employed in single-chassis operation, but with instructions that vary, sometimes per line card, depending on the ingress and egress chassis of a packet. Extra processing is largely avoided, and some unique features such as a single LAG with member ports on both chassis, even further reduce cross-chassis traffic and to reduce the likelihood that the entire stacked system will fail due to the failure of any one line card. The two chassis can be reconfigured readily as two separate switches by disabling stacking and rebooting.

Figure 1:
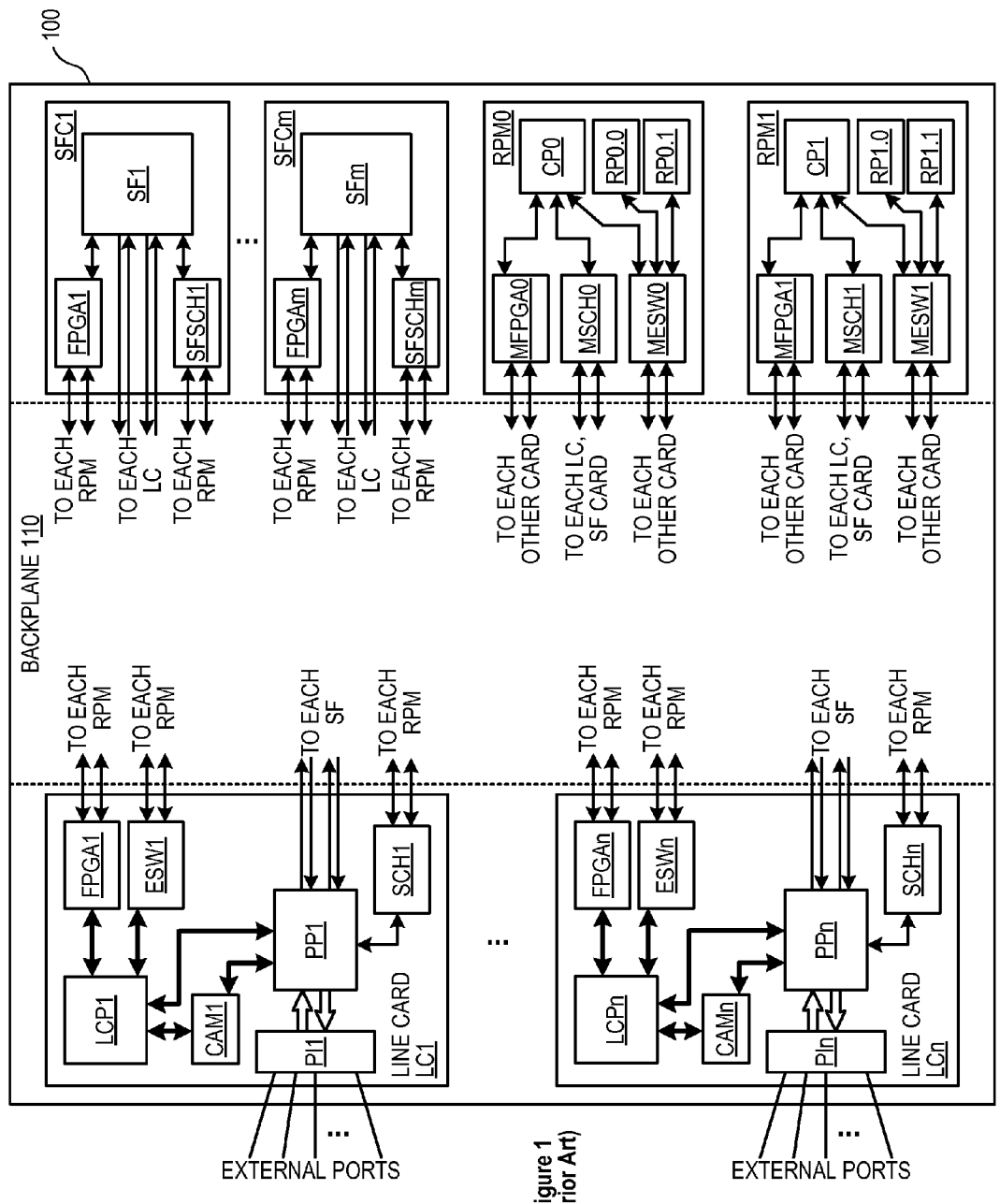
FIG. 1 contains a block diagram for a prior art packet switch.
Figure 2:
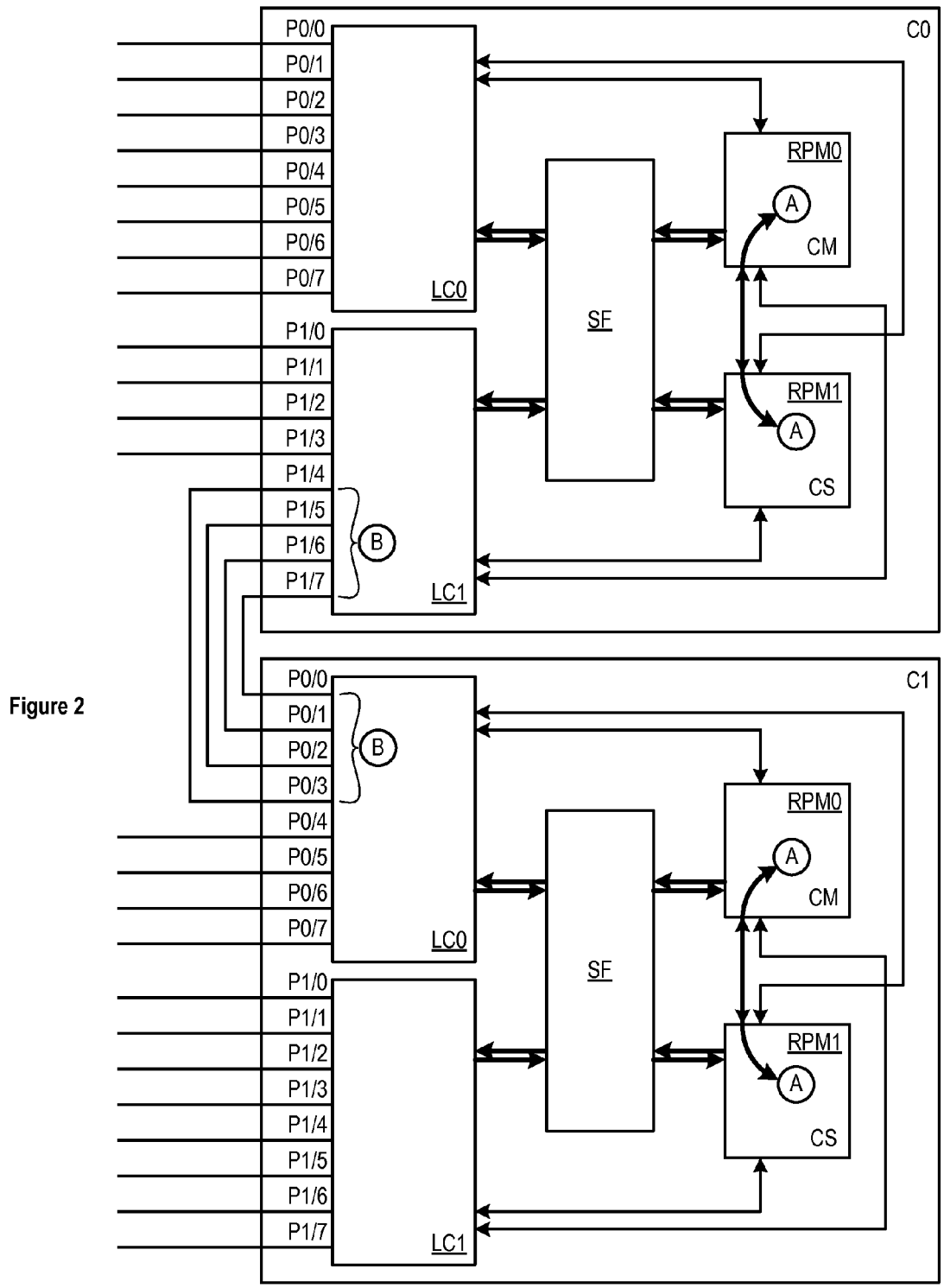
FIG. 2 contains a block diagram for a pair of packet switches connected for stacking according to an embodiment.

FIG. 2 illustrates a representative configuration for a stacking embodiment of two chassis, C0 and C1. Each chassis contains two RPMs, RPM0 and RPM1, a switch fabric SF, and two line cards LC0 and LC1, interconnected, e.g., as described with reference to FIG. 1. Each line card on each chassis has eight external "front-end" ports, number Px/y, where x is the line card number and y is the port number on that line card. Each such port provides a connection available for linking the switch to a peer device or endpoint. Those skilled in the art will recognize that the number of line cards, ports on each line card, RPMs, switch fabrics, and bus structure shown in FIG. 2 are but one among many possibilities for switch architectures that can be connected as a larger logical chassis according to an embodiment. Also, it should be understood that although FIG. 2 shows a stacking port group included in only one line card in a chassis, that each line card can include one or more members of the stacking port group.

In FIG. 2, when the two systems are booted two sets of transactions (labeled "A" and "B" in circles) take place. The A transactions take place between the two RPMs on each chassis as the RPMs boot (if only one RPM existed on a chassis, the A transactions would not occur). The A transactions elect a chassis master CM and a chassis slave CS on each chassis. In the example, RPM0 on each chassis is elected as the chassis master. The chassis master on each chassis boots the line cards LC0, LC1, on its respective chassis. Each line card CPU is booted with a stacking task, which communicates with a stacking manager task on the chassis master.

A network administrator configures the switches for stacking using a set of stacking parameters stored in configuration memory. The stacking parameters can included, e.g., a Master Priority, a Unit Number, and a Stacking Port Group (SPG) to be used for stacking. When stacking is configured, the local chassis master downloads the stacking parameters to the line cards. The line card containing the Stacking Port Group can either perform discovery on one of the ports of the SPG or attempt to bring up a stacking LAG (SLAG) containing the members of the SPG first. In the FIG. 2 example, the stacking line cards exchange protocol information B, respectively between ports P1/4, P1/5, P1/6, and P1/7 on line card LC1 of chassis C0 and ports P0/3, P0/2, P0/1, and P0/0 of line card LC0 of chassis C1. This forms a four-member link aggregation group (SLAG, FIG. 3) between the two chassis. The operation of a LAG between two switches is well understood and will not be described further.

Figure 3:
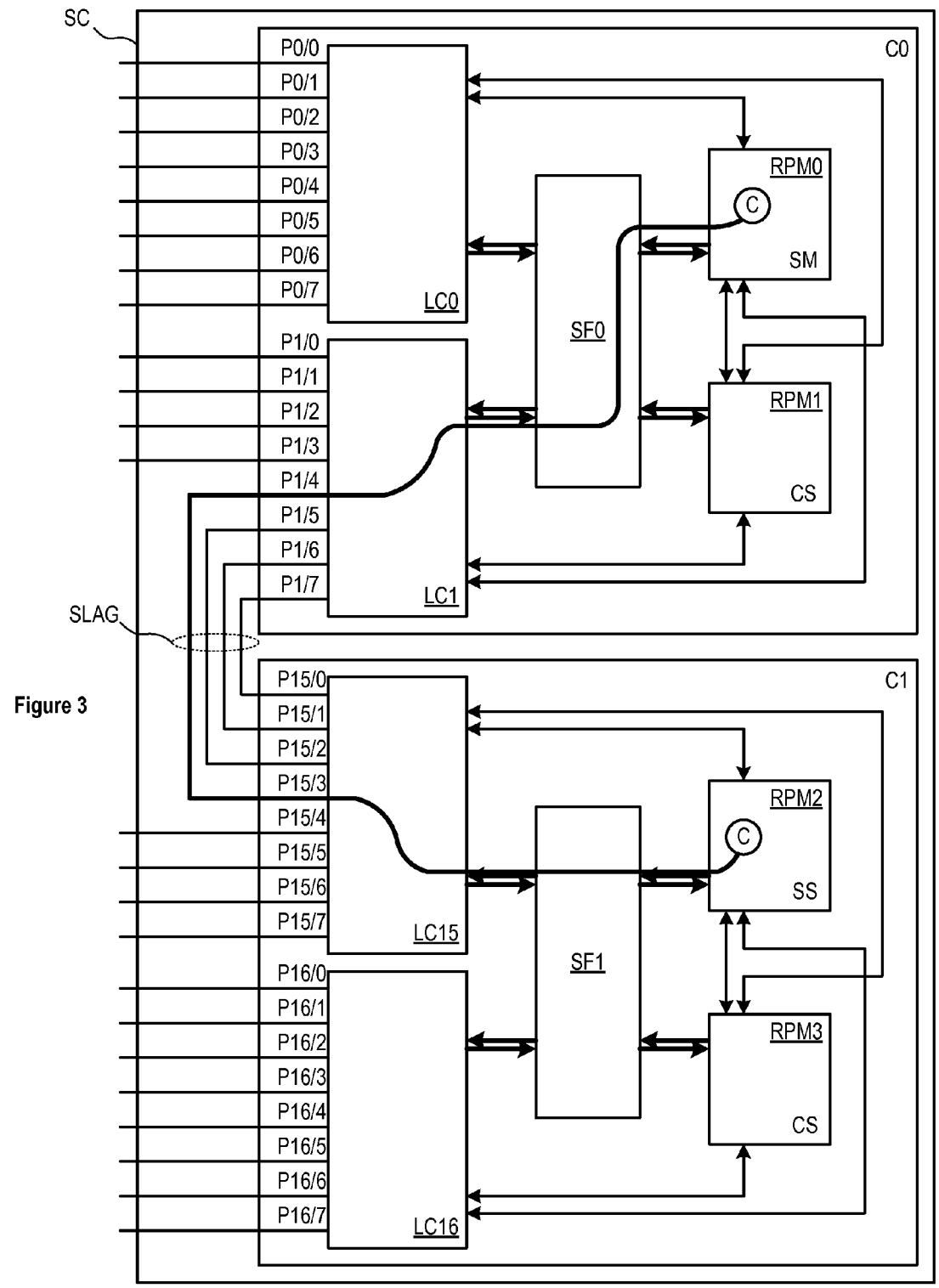
FIG. 3 shows stack configuration channels for initializing the configuration of two packet switches as a common logical switch.

FIG. 3 shows further configuration of the stack after creation of the stacking LAG SLAG between them. Either the stacking line cards or the chassis master RPMs conduct a discovery mechanism C to determine the stack membership and elect a stack master. Stack discovery and election messages are sent to a specially designated MAC address and Ethertype, which is either trapped by the stacking line card CPU and processed by the stacking agent, or forwarded to the chassis master RPM and processed by the stacking master. One chassis sends out a discovery initialization message on a stacking port, including the sender's Master Priority (MP), preferred Unit Number (UN), and Media Access Control (MAC) address. The other chassis, if discoverable, returns a discovery initialization message with both its own stacking parameters MP, preferred UN, MAC, and those received from the first chassis. The first chassis then sends another discovery initialization message repeating these parameters.

Once both chassis have acknowledged the stacking parameters of the other in an initialization message, the chassis enter an election phase. The chassis with the highest MP (if equal, the chassis with the highest MAC) is elected as master. The chassis master then sends a master election message containing the following: My MP, My UN, My MAC, Your MP, Your Actual UN, Your MAC, Master MAC (same as MY MAC), Master UN. The master may bump up its MP at this time to the maximum allowed, such that other chassis joining the stack cannot shift the master chassis of an operating stack.

The chassis that has decided it is not the master will wait for the master to send the master election message. When the subordinate chassis receives the master election message, it responds with a master election acknowledgment message containing the following: My MP, My UN, My MAC, Master UN, Master MAC. The subordinate chassis then moves to the operational state. Upon receiving the master election acknowledgment message, the master also moves into the operational state.

Once in the operational state, the two chassis periodically exchange Hello messages that identify My MAC, Your MAC, Master MAC. Should the information received in a Hello message conflict with the local information, the receiving chassis initiates a new discovery mechanism by sending a new discovery initialization message with only its own stacking parameters.

The discovery and election states have timers representative of the times expected for a peer to respond. Should a peer not respond within a set time period, the last sent message is repeated. After a set number of retransmissions, the stack discovery process moves back to the idle state to await either a retry timer or a received discovery initialization message with only the remote unit's data. The retry timer can be set to try to establish the stack connection at large intervals.

The logical stacked chassis (SC in FIG. 3) uses the Unit Numbers of the member chassis to assign unique port numbers to each port in the stack. In the FIG. 3 example, chassis C0 has been elected stack master and its master RPM, RPM0, is the stack master RPM SM. The master RPM on chassis C1 has been elected the stack slave RPM SS. C0 has a UN of 0, and C1 has a UN of 1. Instead of assigning line card slot numbers starting from 0, the slot numbers used on each chassis depend on the UN negotiated for that chassis. Thus each UN 0 has ownership of line card slots UN*ChassisMaxSlot (a hardware-dependent parameter representing the maximum number of slots available in any chassis that can be stacked with this chassis) to (UN+1)*ChassisMaxSlot−1. In the FIG. 3 example, ChassisMaxSlot=15, and thus chassis C0 assigns its line cards slot numbers 0 and 1, and chassis C1 assigns its line cards slot numbers 15 and 16. With stacking enabled for more than two chassis, the additional chassis follow the same convention.

For network administration and management, status display, etc., the port numbers displayed and used are a unit number/slot/port combination, e.g., as shown in the port assignment of FIG. 3. The RPMs and line card CPUs exchange forwarding information in the logical slot/port format, for management and control plane protocols. When the local line card agents store addresses in the hardware lookup tables (e.g., pointed to by CAM1 of LC1 in FIG. 1), however, the forwarding instructions for each packet will refer to a local switch fabric ID and local port (or switch fabric group and local ports). When the appropriate system card and port are on a remote chassis, the line card agents program the hardware lookup tables with a local switch fabric ID and local port of the stacking LAG to reach the remote chassis. This programming distinction is explained in further detail in the examples below.

In a single chassis system, the master RPM and line card CPUs communicate over backplane Ethernet connections, using InterProcess Communication (IPC) messages between peered tasks on each CPU to administer protocols, keep hardware tables synchronized, etc. In a stacked chassis, the line card CPUs can communicate with the stack master RPM SM to administer protocols, keep hardware tables synchronized, etc. Although local IPC exchanges could continue to use the backplane Ethernet, IPC exchanges with a remote stack master RPM cannot use this mechanism (absent a special-purpose chassis-to-chassis backplane Ethernet switch, a possible alternative mechanism, but requiring a potential system redesign). To simplify communication, all IPC messages in one embodiment traverse the switch fabric connections, whether local or remote. Stacked chassis-specific packet management processes are indicated in FIGS. 4-19 by a circled number, with white circles generally indicating processing that adds a header and black circles indicating processing that removes a header, with the same number indicating the same type of header.

Figure 4:
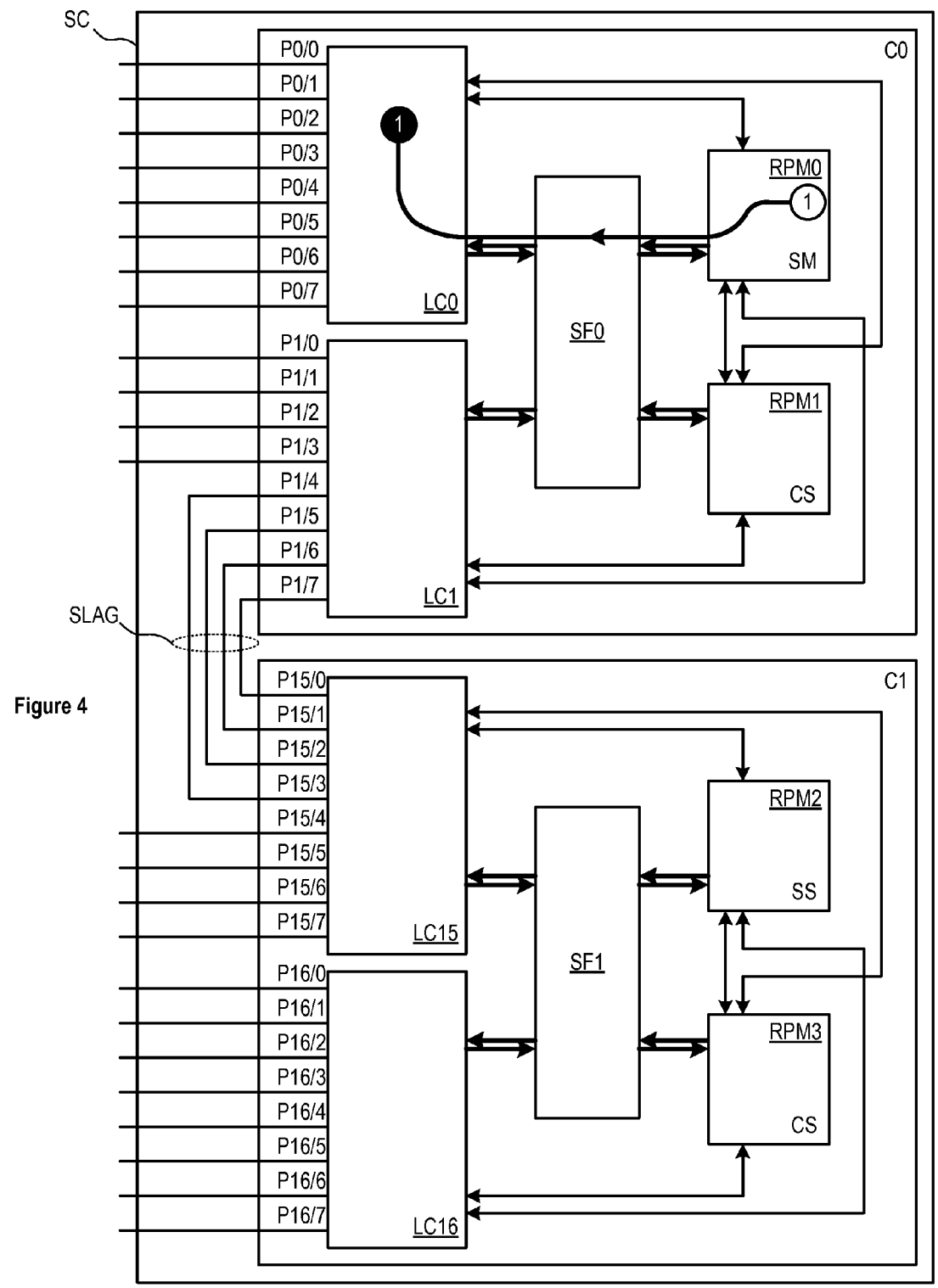
FIGS. 4-19 show, for the virtual switch configuration of FIG. 3, various programming and packet switching scenarios according to the embodiments.

FIG. 4 shows an IPC communication from the stack master RPM SM to a line card CPU on the same chassis. Each line card CPU is assigned an IP address and a MAC address according to its system-wide slot assignment. When an RPM application on stack master SM creates an IPC packet, it hands the packet off normally to the sender network IP stack, along with the receiving line card CPU IP address or slot identification. The IP stack adds UDP (Uniform Datagram Protocol) and IP headers, with the IP address of the line card CPU and hands it to the IPC driver. Since the LC is in the local chassis, the IPC driver adds the Ethernet header, sends this packet to the Ethernet switch, which forwards it to the corresponding LC and is processed at the IP stack in that LC. Since the stack master RPM also controls the line cards on chassis C1, IPC packets constructed in the manner described in the FIG. 4 example also require delivery to line cards on the remote chassis C1.

Figure 5:
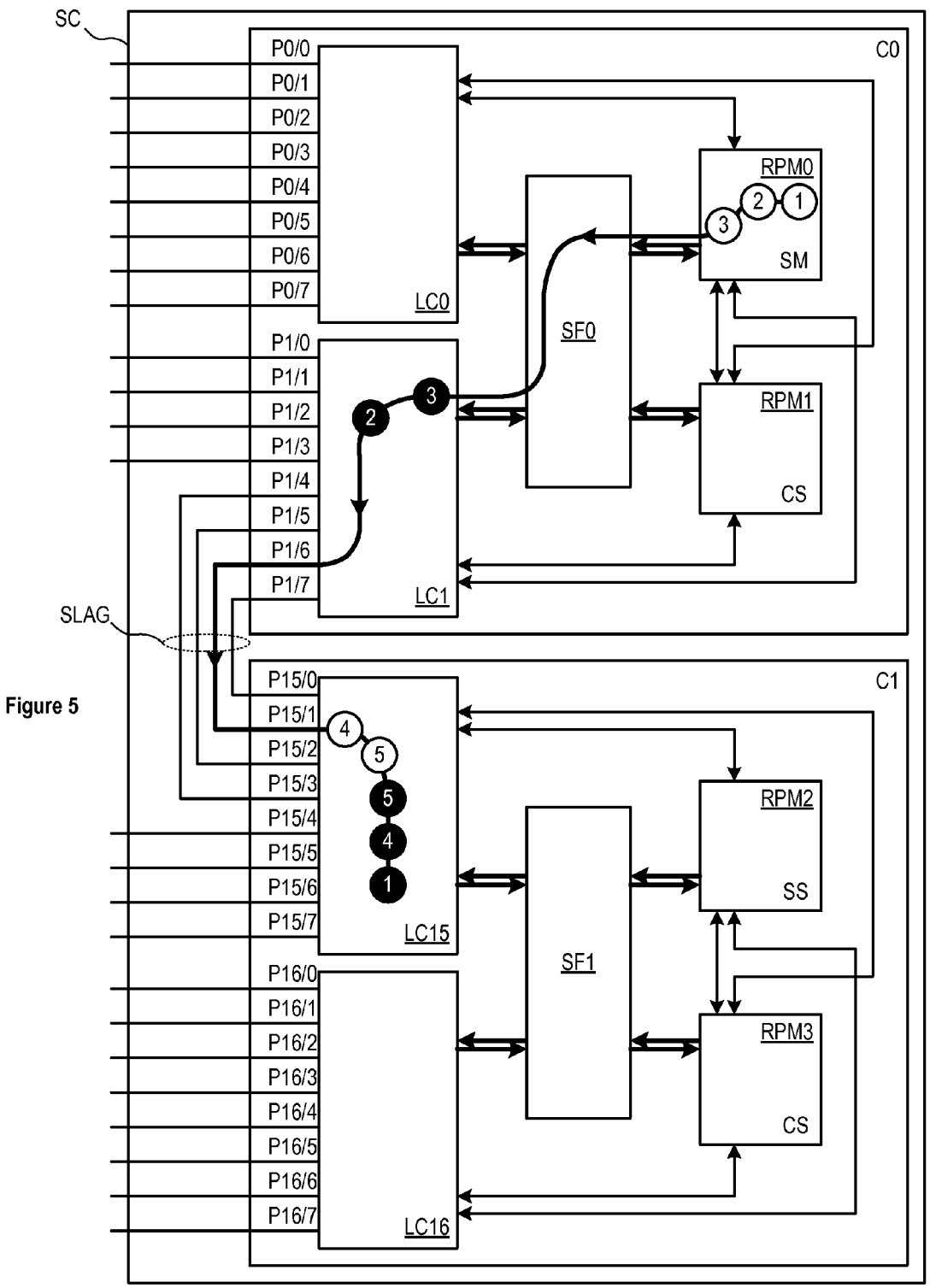

FIG. 5 illustrates delivery of an IPC packet to the stacking line card LC15 on remote chassis C1. Like in the FIG. 4 example, the stack master RPM creates an IPC packet and adds a Ethernet header identifying the final destination LC (1), an Switch Fabric Header identifying the SLAG port (the exact stacking LAG port to be used in this case P1/6) on which this packet should be sent to the other chassis (2), and an Ethernet Header identifying the LC which has the corresponding port (3).

Once the IPC packet reaches line card LC1, the line card reads and strips the Ethernet header and Switch Fabric Header (3 and 2). The packet is then queued for egress out stacking port P1/6 using standard front-end port L2 forwarding.

When the IPC packet arrives at port P15/1 on chassis C1, line card LC15, an L2 lookup reveals that the packet is addressed to the line card LC15 CPU. This is then sent to the LC CPU after adding a Switch Fabric Header (4) and an Ethernet Header (5) identifying the incoming port. The line card CPU IPC process reads and strips the Ethernet header (5) and the switch fabric header (4). The line card CPU IPC process reads and strips the ethernet header (1) and passes it up to the IP stack to determine the source process, packet type, destination process, etc. After IP and UDP header processing, the packet contents are delivered to the target process on line card LC15.

Figure 6:
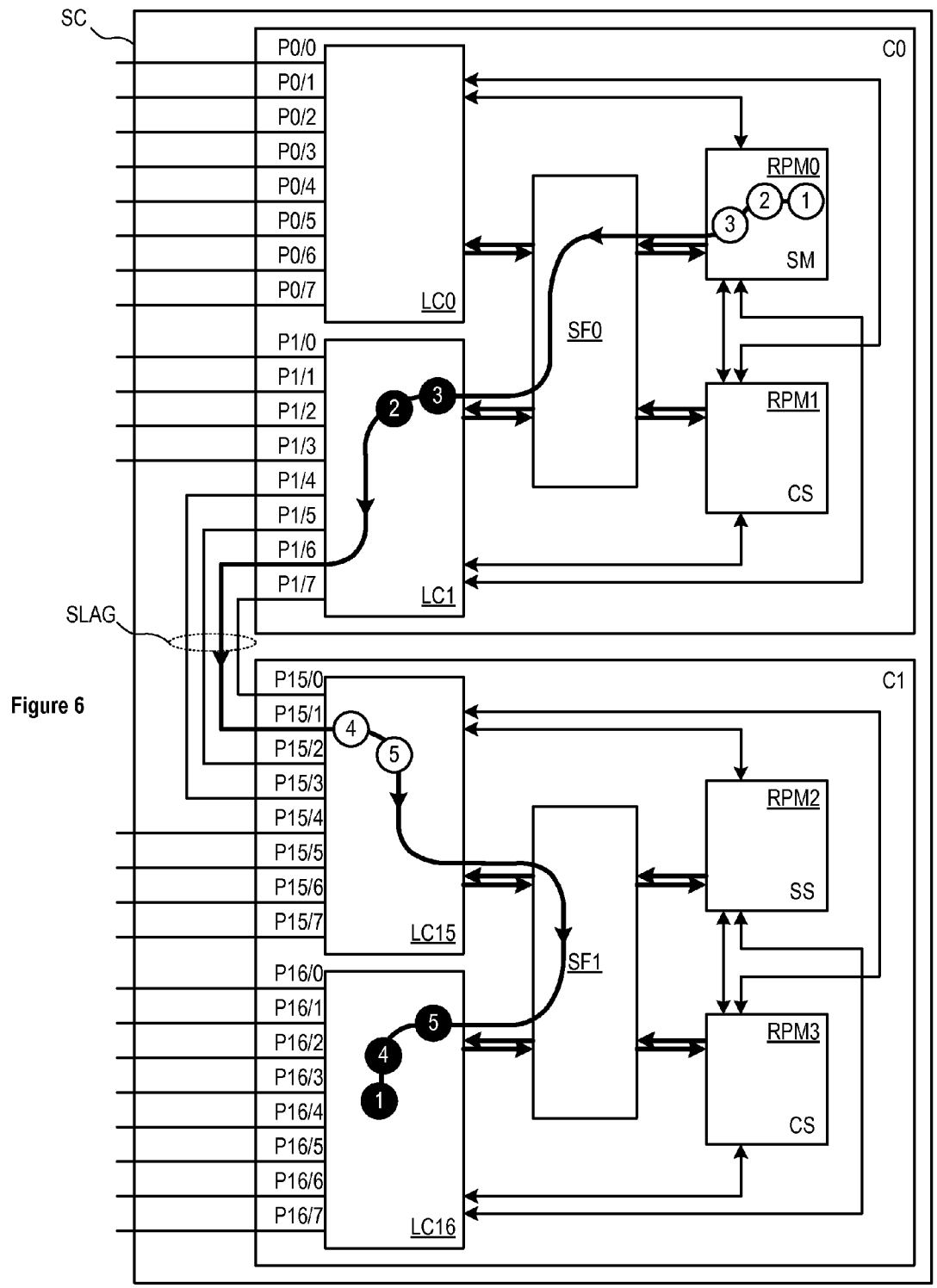

FIG. 6 illustrates delivery of an IPC packet to a non-stacking line card LC16 on remote chassis C1. From the RPM point of view and stacking line card LC1 point of view, processing and forwarding are identical to the FIG. 5 example, except the Ethernet header (1) contains a MAC DA assigned to line card LC16. When the IPC packet arrives at LC15 on stacking port P15/1, an L2 lookup reveals that the packet is addressed to a MAC DA assigned to line card LC16. The forwarding instructions at LC15 instruct LC15 to add a second switch fabric header (4) and Ethernet Header (5) identifying LC16 and forward the IPC packet through SF1 to LC16. At LC16, the Ethernet Header and switch fabric header is read and stripped (5 and 4), directing the packet to a queue for the line card CPU. The line card CPU IPC driver reads and strips the Ethernet header (1)—the MAC DA and Ethertype and passes the packet to the IP/UDP layer. After IP and UDP header processing, the packet contents are delivered to the target process.

The stacked chassis SC also peers with other nodes through the front-end ports to support a wide variety of peer-to-peer and network protocols. Many of the control protocols are handled centrally by processes running on one of the processors of the stack master RPM, although the peer node can be connected through any of the non-stacking front-end ports.

Figure 7:
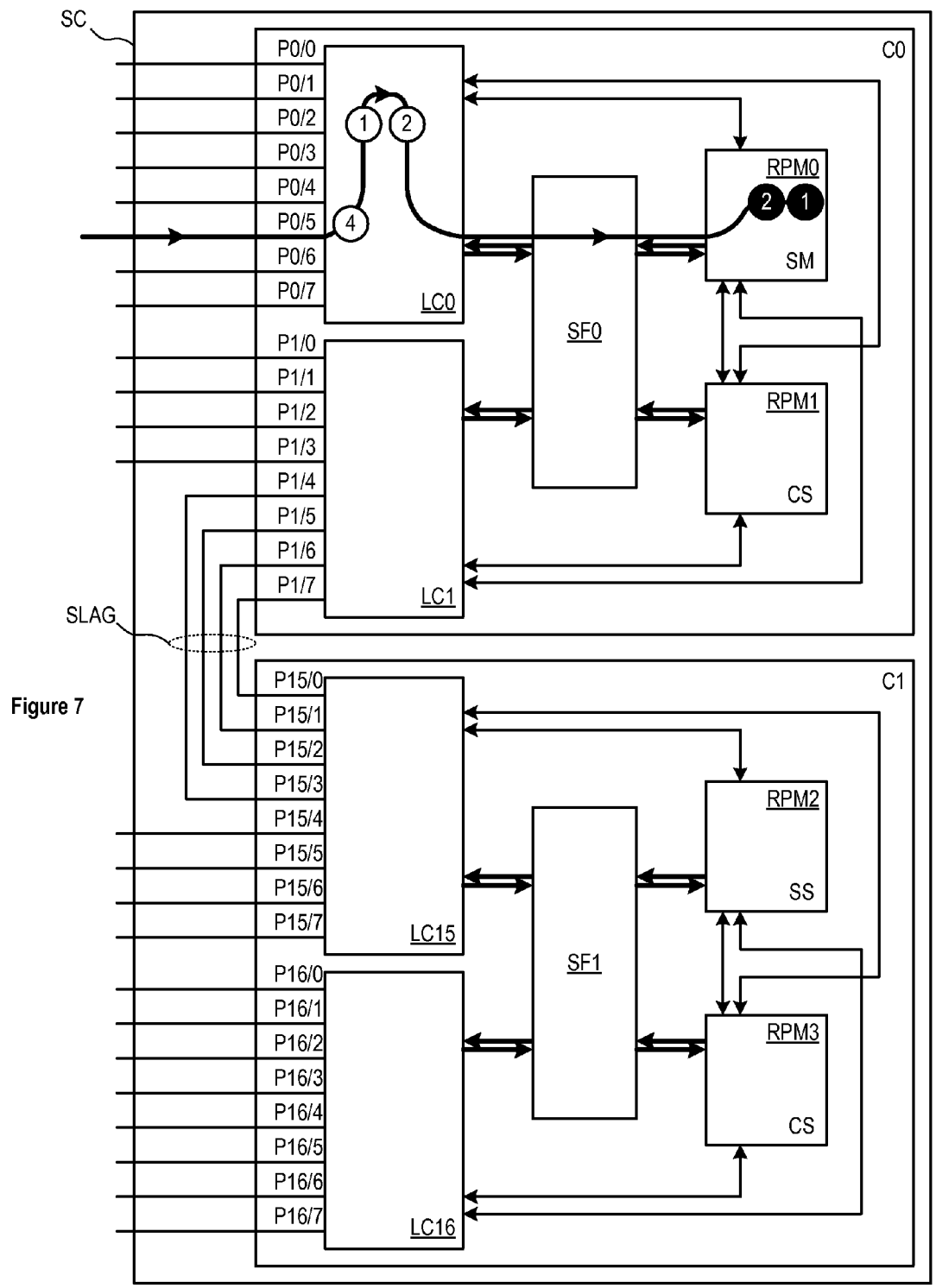
Figure 8:
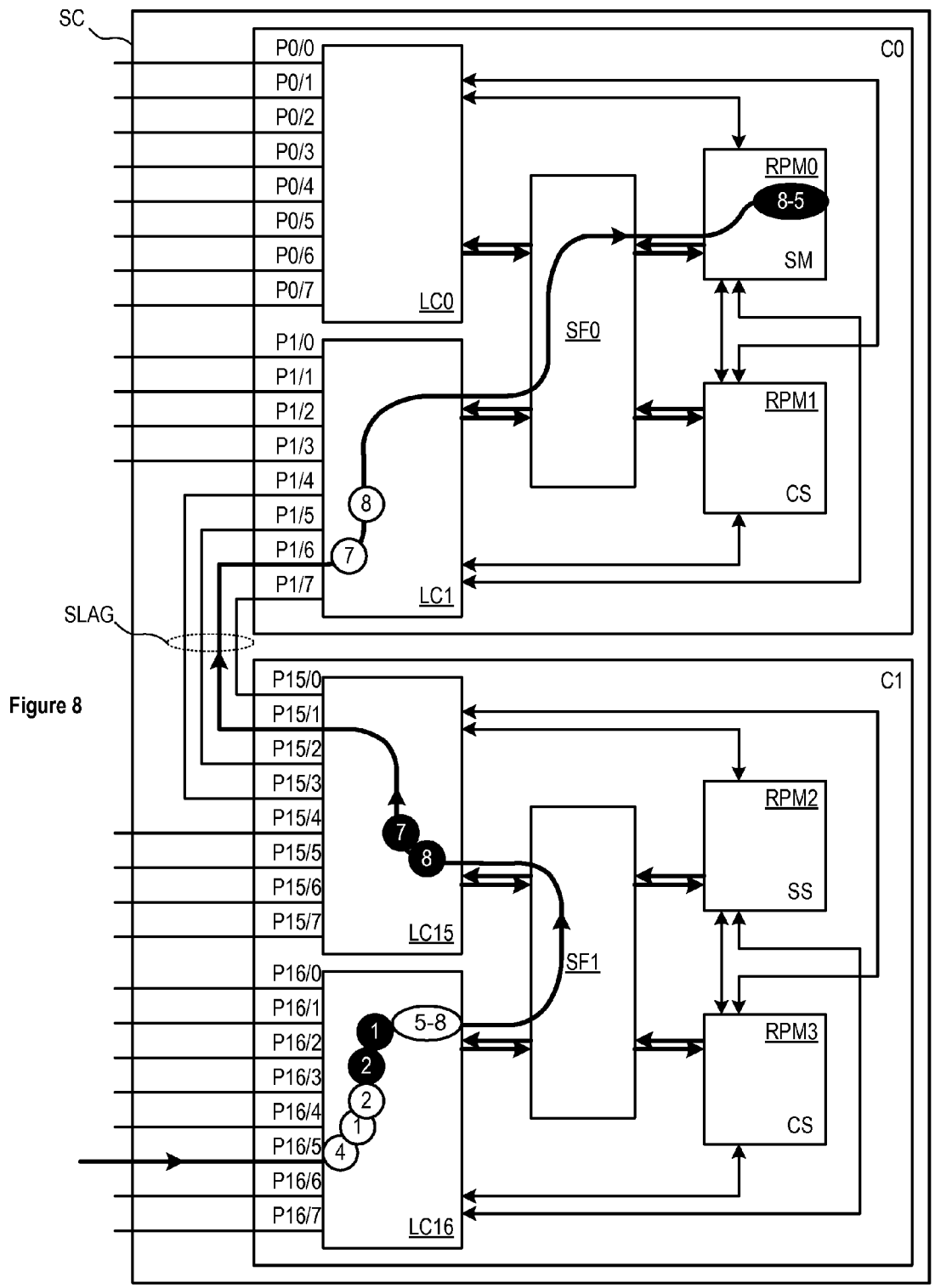

FIGS. 7 and 8 illustrate, respectively for a local and a remote line card, packet handling for front-end control packets. For uniformity of handling, each line card is programmed to trap incoming packets from its front-end ports to the local chassis master. When the chassis master receives the packet, if it is the stack master it sends the packet up to the applications to process it, or else it forwards the packet to the stack master for processing. Referring first to FIG. 7, a control packet arrives on line card LC0, port P0/5. A layer-2 lookup (4) sends the packet to the local chassis master CPU. At the LC, the packet is appended with a switch fabric header (1) and an Ethernet header (2). The Ethernet header identifies the appropriate RPM CPU to which the packet is directed. The control packet is then queued for transmission through SF0 to RPM0. When the control packet arrives at RPM0, since this is the stack master, the packet is processed, and the Ethernet Header and Switch Fabric Headers are processed and the packet sent up to the appropriate application. (Change in diagram 7, at the Line card add header (1) Switch Fabric Header and (2) Ethernet Header. At the RPM CPU strip these two headers)

FIG. 8 shows an example wherein a control packet arrives at a line card LC16 on the remote chassis C1. A layer-2 lookup (4) is performed, headers (1) and (2) are added and the packet is sent to the LC CPU where the headers (2) and (1) are striped, headers (5), (6), (7) and (8) are added and the packet is send to LC 15. At LC 15 headers (8) and (7) are striped and the packet is sent to LC1 on chassis 0. On LC1, header (7) and (8) are added and the packet is sent to RPM0, where all of the header are removed and the packet is processed.

When the control packet arrives at stacking port P1/6 on the master chassis C0, a layer 2 lookup (4) indicates forwarding to the stack master RPM, RPM0. A new switch fabric header (7) and an Ethernet header (8) identifying the RPM CPU is added, and the packet is sent to the RPM CPU. At the RPM CPU the headers (7 and 8) are stripped of, and the CPU knows that this is the master CPU and this is a control packet from the remote LC, so it strips of the headers (5 and 6) and then sends it up to the application to process the packet. The above processing which is performed in the non-master RPM could also be performed by special purpose FPGA or other hardware devices to improve the latency of the packet and also to reduce the load on the CPU In addition to receiving protocol control packets via front-end ports, the stack master RPM must also transmit protocol control packets to front-end port peers. For front-end ports located on the same physical chassis as the stack, the packet transmit driver on the RPM sees that the destination port is on the same physical chassis, and merely adds a backplane header that will switch the packet through the switch fabric to the appropriate line card and front-end port. For front-end ports located on a different chassis in the stack, this approach would result in the second chassis forwarding the packet, including undesirably increasing the hop count, so a different approach is taken.

Figure 9:
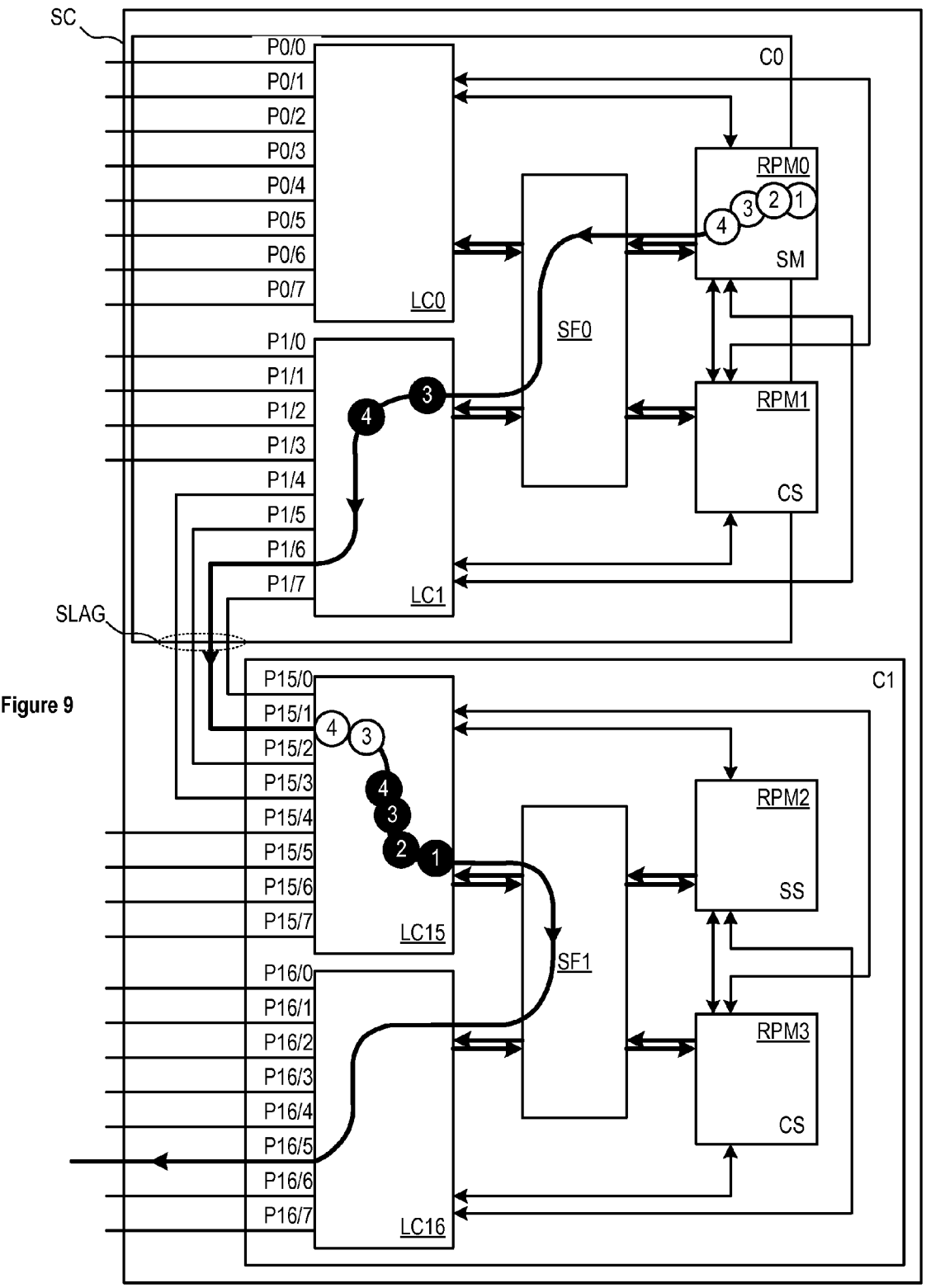

FIG. 9 shows an example for a transmit control packet generated by the stack master RPM RPM0 on chassis C0, and destined for front-end port P16/5 on chassis C1. The stack master RPM transmit driver adds a switch fabric header describing the output port destination (1), an Ethernet header (2) with the MAC DA as the LC 16, and a switch fabric header (3) that directs the packet to a stacking port (in this case P1/6) connected to chassis C, and an Ethernet header (4) directing the packet to LC1, which has the stacking port. The packet reaches LC1, where the outer Ethernet and Switch Fabric Header (4,3) are removed and the packet is transmitted on the port P1/6.

When the control packet arrives on port P15/1 of line card LC15, a layer 2 lookup (4) is performed on the Ethernet header, causing the packet to be sent to the line card CPU, after the addition of a Switch Fabric Header and Ethernet Header identifying the local Line Card CPU (3,4). The line card CPU examines and removes the Ethernet header (4) and switch fabric header (3), allowing the CPU to determine the RPM's instructions for a target egress port (from headers 2 and 1). It then removes these headers and sends the packet on the corresponding egress port using the switch fabric.

In many applications, one of the primary uses of the stacked chassis will be to forward packets between one of the front-end ports using layer-2 switching. FIGS. 10-14 illustrate various aspects of a layer-2 switching embodiment for the stacked chassis.

Figure 10:
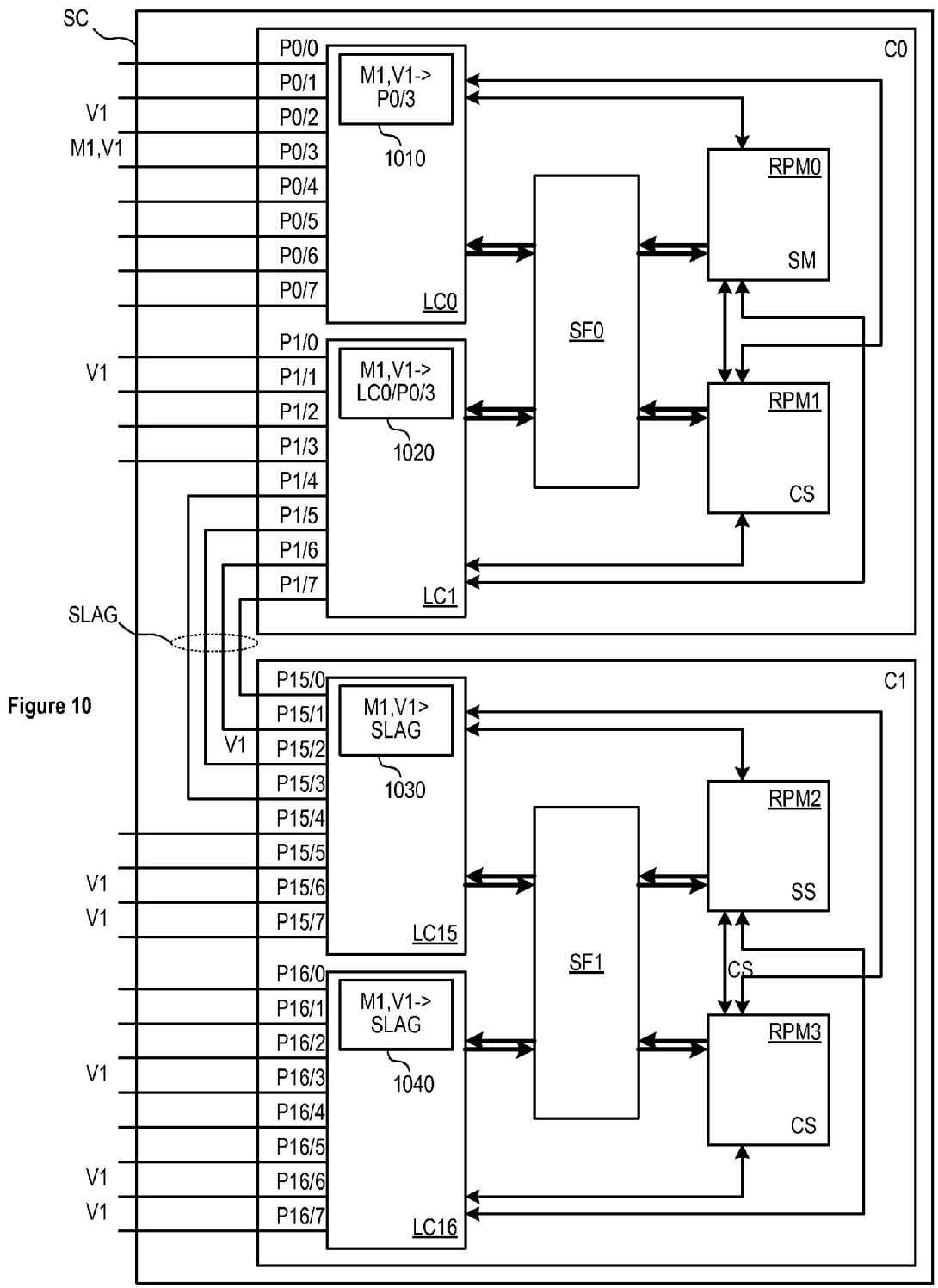

FIG. 10 shows L2 unicast setup for a particular MAC address M1 assigned to a VLAN V1. VLAN V1 membership includes some ports on all four line cards depicted. Because chassis C0 and chassis C1 are stacked, the stacking port (SLAG) is also a member of VLAN V1. The cards administering the ends of SLAG, however, disable MAC address learning on the stacking port.

When the new source MAC address (one that is not found in the hardware tables on the receiving line card) M1 appears in a packet arriving on port P0/3 of LC0, VLAN V1, an agent process in the line card processor is alerted to change the L2 MAC table in line card LC0. The local L2 MAC table 1010 is set to associate the MAC address, VLAN pair (M1, V1) with port 3. The agent also converts the local port number to a system-wide port number (P0/3) using its system-wide line card number, and sends an IPC L2 learn message (the transmission of IPC messages has been described above) to a manager process on the stack master RPM SM. The manager process updates the master L2 table and sends IPC messages to the L2 agents on all other line cards of the stack.

When a line card L2 table agent receives an update message from the stack master RPM, it examines the egress port to be associated with the new MAC address and VLAN. When the egress port is on the same chassis, such as is the case for line card LC1, the agent sets the local L2 MAC hardware table 1020 to associate the MAC address, VLAN pair (M1, V1) with the chassis address of the egress port (LC0/P0/3). When the egress port is on another chassis, the agent sets the local L2 MAC hardware table (1030 and 1040) to associate the MAC address, VLAN pair (M1, V1) with the chassis address of the stacking port LAG.ID as the egress address.

Figure 11:
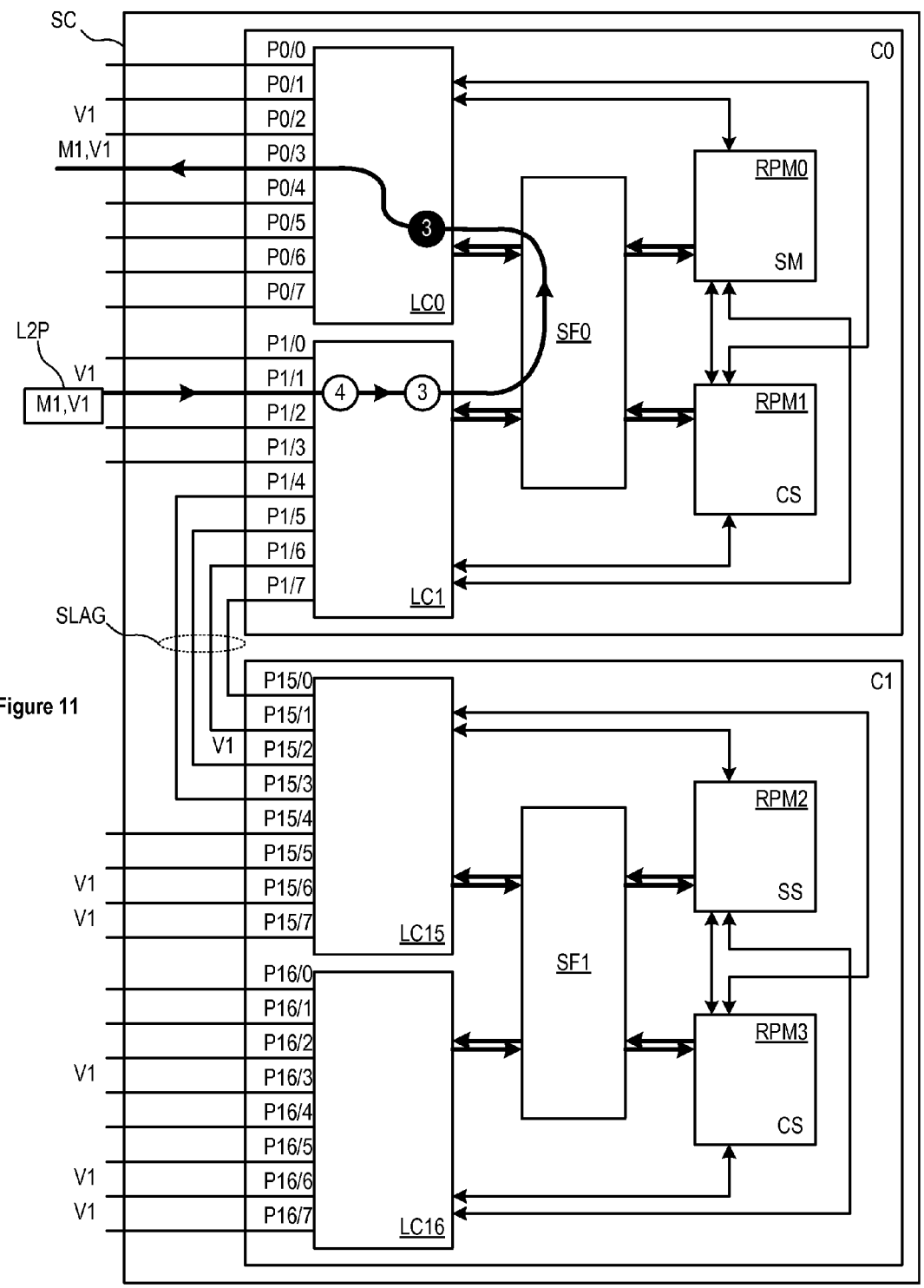

FIG. 11 illustrates unicast forwarding of a layer 2 packet L2P. Packet L2P arrives on line card LC1, port P1/1, with a MAC address M1 and a VLAN ID V1. The packet processor uses the hardware table (1020, FIG. 10) to perform a hardware layer 2 lookup (4), with a lookup key including M1 and V1. The lookup returns instructions to switch the packet to egress port P0/3. A backplane header is constructed to direct the packet to LC0, port 3, and the packet processor queues the packet for transmission across switch fabric SF0. Subsequently, the packet is scheduled through SF0 and arrives at LC0. The backplane header is stripped (3) and the packet is transmitted out egress port P0/3.

Figure 12:
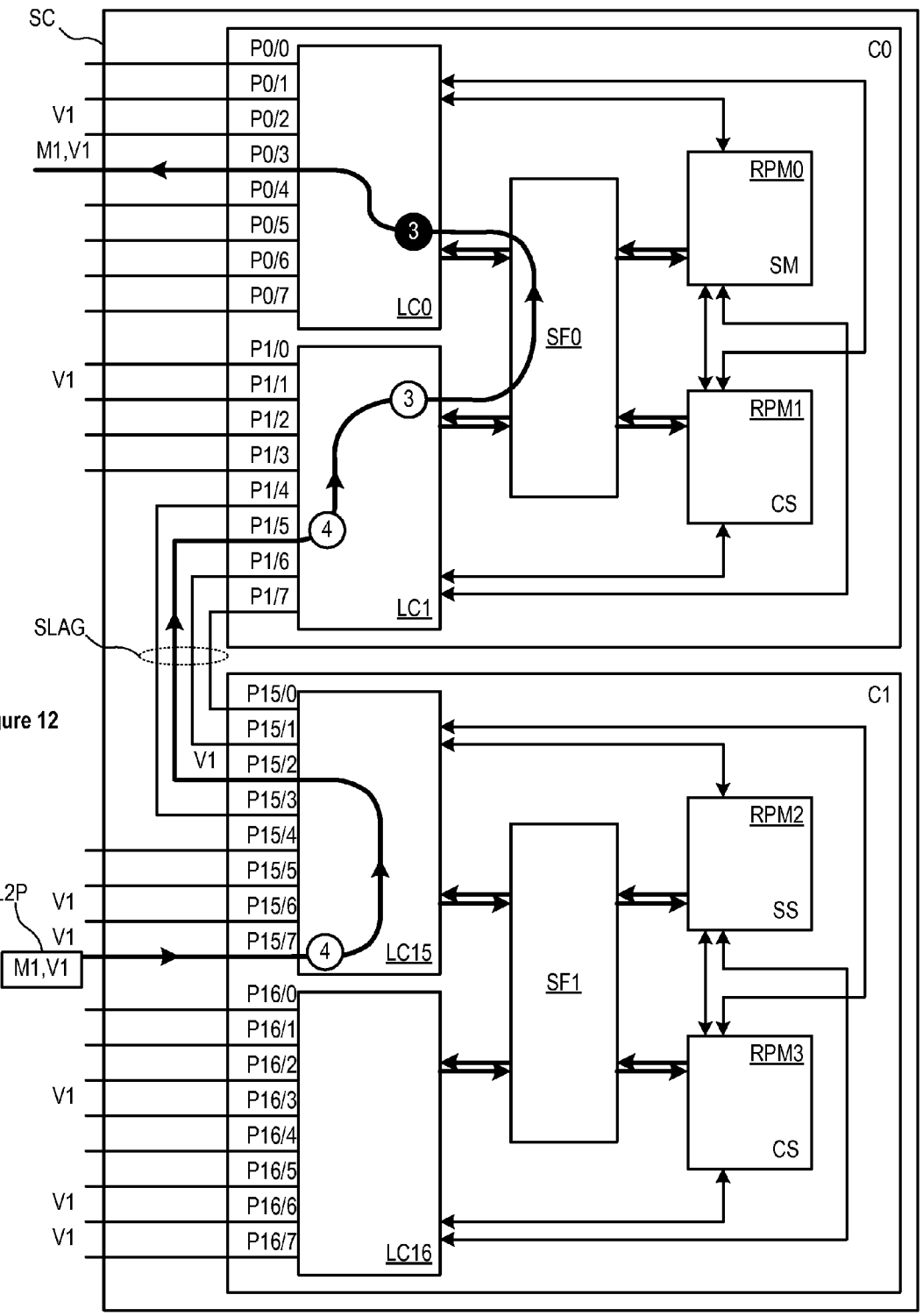

FIG. 12 also illustrates unicast forwarding of the layer 2 packet L2P, except in the FIG. 12 example the packet arrives at port P15/7, line card LC15, on chassis C1. The packet processor uses the hardware table (1030, FIG. 10) to perform a hardware layer 2 lookup (4), with a lookup key including M1 and V1. The lookup returns instructions to transmit the packet on egress port as SLAG. The hashing mechanism would then identify the specific port to be used, say P15/2 in this case.

When the packet L2P arrives at port P1/5 on LC1, after traversing the stacking LAG, the packet processor on LC1 uses the hardware table (1020, FIG. 10) in identical fashion to that illustrated in FIG. 11 to switch the packet through to egress port P0/3.

Although the FIG. 12 example uses two layer 2 lookup operations to switch packet L2P through the stacked system, there is one fundamental difference between the two lookup operations. When packet L2P arrives at its original ingress port (P15/7), the source address found in the packet could be learned if not already known, including sending an IPC message to the stack master RPM to cause the source address to be learned across all chassis. When the packet L2P arrives at the stacking port P1/5, however, even if the learning process from the original ingress port has not propagated to line card LC1 yet, the hardware will not initiate a second learning operation. Once a port has been designated as a stacking port, all learning of L2 addresses on that port is disabled.

Figure 13:
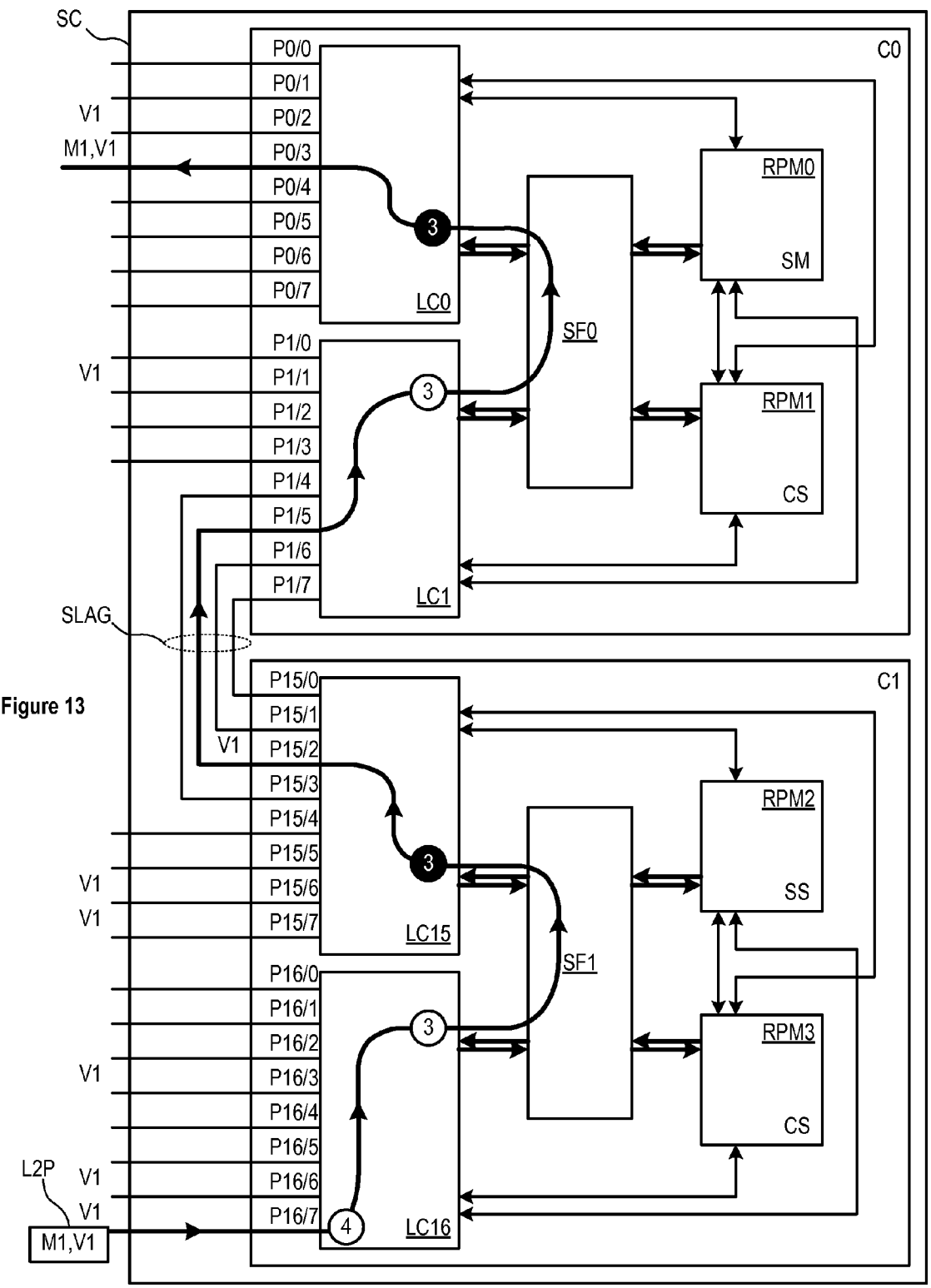

FIG. 13 also illustrates unicast forwarding of the layer 2 packet L2P, except in the FIG. 13 example the packet arrives at port P16/7, line card LC16, on chassis C1. The packet processor uses the hardware table (1040, FIG. 10) to perform a hardware layer 2 lookup (4), with a lookup key including M1 and V1. The lookup returns instructions to transmit the packet on egress port SLAG (and then hashing determines the port as P15/2), on a different line card than the ingress line card (and the line card containing the stacking ports). A backplane header (3) is constructed to direct the packet to LC15, port 2 (using chassis slot numbering), and the packet processor queues the packet for transmission across switch fabric SF1. Subsequently, the packet is scheduled through SF1 and arrives at LC15. The backplane header is stripped (3) and the packet is transmitted out egress port P15/2 across the stacking link. When the packet L2P arrives at port P1/5 on LC1, after traversing the stacking LAG, the packet processor on LC1 uses the hardware table (1020, FIG. 10) in identical fashion to that illustrated in FIG. 11 to switch the packet through to egress port P0/3.

During layer 2 switching, several circumstances (including an unknown destination MAC address) can cause a packet to be flooded to all ports of a VLAN. In the stacked chassis configuration, where the ports of a specific VLAN are located across multiple chassis, this challenge is met by including the stacking port, on both chassis, as a member of each VLAN (or, alternately, each VLAN having members on multiple chassis).

Figure 14:
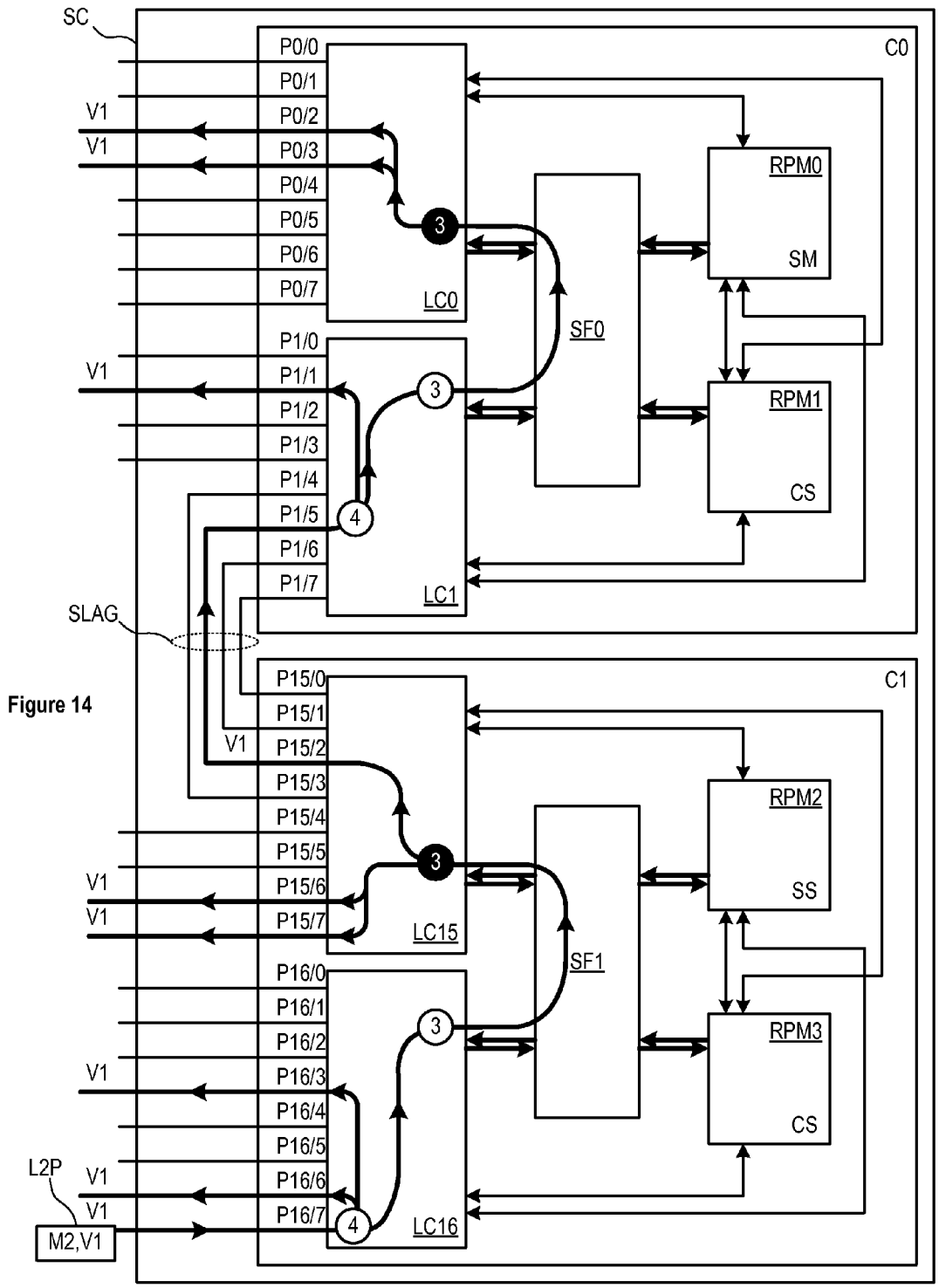
Figure 15:
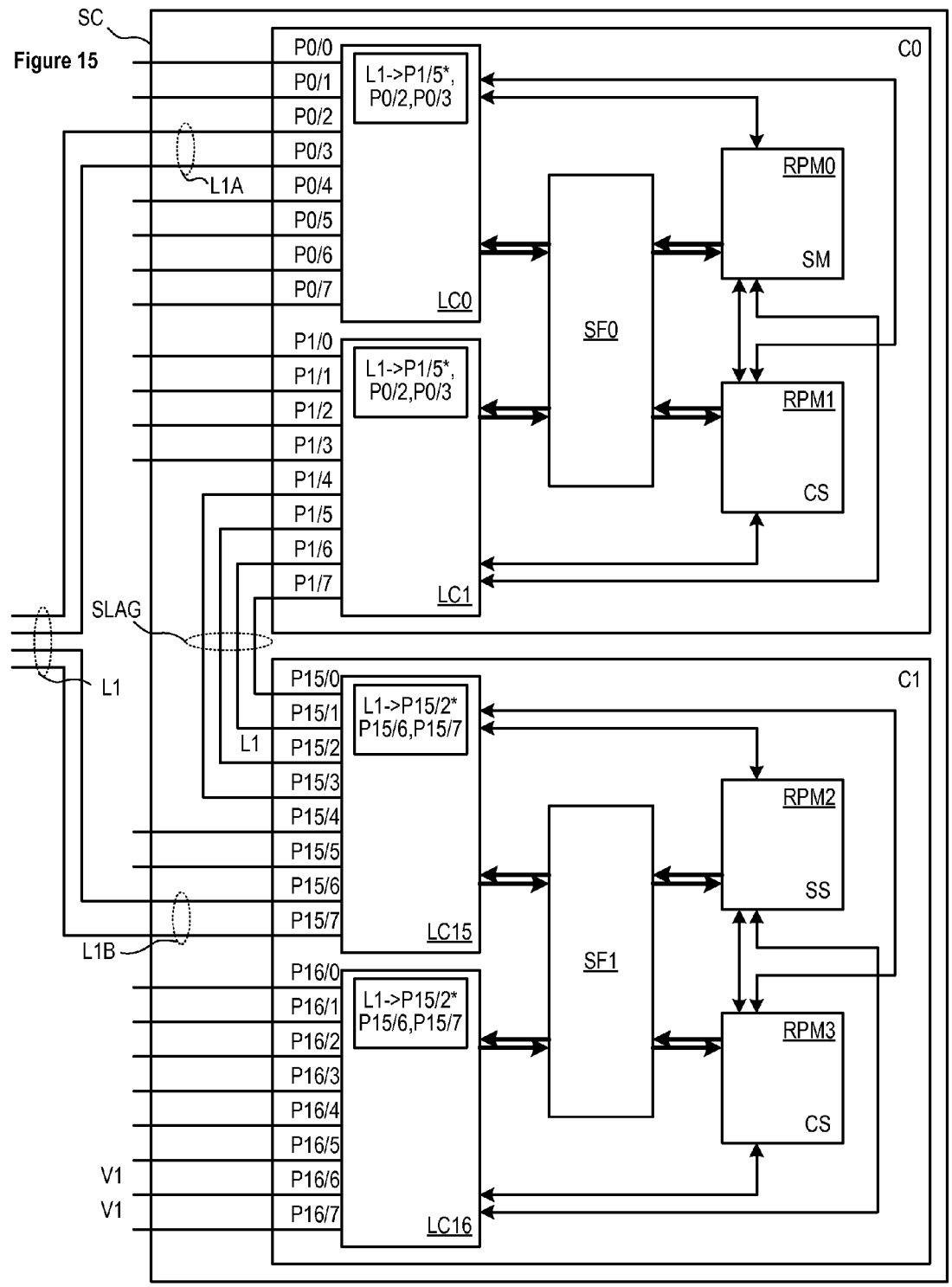

FIG. 14 illustrates a flooding example for the VLAN V1 membership configuration of FIGS. 10-14. A packet L2P arrives at VLAN V1 port P16/7 on line card LC16. The destination MAC address M2 carried in the packet is unknown, causing a hardware lookup (4) to return no matching egress port. The packet processor responds by retrieving packet flooding instructions (e.g., an Egress Processing Index (EPI) and a switch fabric multicast group). The EPI, when decoded locally, indicates the local V1 ports to be flooded (P16/3 and P16/6, with P16/7 blocked as it is the source port). The EPI is also included in a backplane header, which is added (3) to a copy of packet L2P that is to be transmitted across switch fabric SF1.

Although FIG. 14 only shows two linecards in chassis C1, a given installation will typically have more line cards, and can have ports from the same VLAN on more than two linecards. Thus the "switch fabric multicast group" specified for flooding will include all linecards with VLAN V1 ports, and the packet will switch through switch fabric SF1 to all included cards. In FIG. 14, the only such card is LC15.

When packet L2P arrives at LC15, its backplane header is read and stripped (3). The EPI is looked up, and instructs the packet processor to forward packet L2P out three egress ports: P15/6, P15/7, and P15/2 (one of the stacking ports). From the packet processor viewpoint, there is no difference in the operations needed to forward the packet out each of the three ports.

When the copy of the packet that traverses the stacking link arrives at the stacking line card LC1, a second L2 lookup (4) is performed by the local packet processor. Like the first lookup on LC16, the unknown destination address causes the hardware lookup to return no matching egress port. The packet processor responds by retrieving packet flooding instructions for chassis C0 (e.g., an EPI and a switch fabric multicast group). There is no requirement that the EPI and switch fabric multicast group number match those used on chassis C1, as the current flooding operation is specific to chassis C0. The EPI, when decoded locally, indicates the local V1 ports to be flooded on LC1 (P1/1 only, with P1/5 blocked as it is the source port). The EPI is also included in a backplane header, which is added (3) to a copy of packet L2P that is to be transmitted across switch fabric SF0.

The switch fabric multicast group includes all line cards (other than the sourcing line card) having V1 member ports (in this example, only LC0). When packet L2P arrives at LC15, its backplane header is read and stripped (3). The EPI is looked up, and instructs the packet processor to forward packet L2P out two egress ports: P0/2 and P0/3. Layer 2 flooding has now been accomplished for all VLAN V1 member ports, across all chassis of the stacked chassis.

An analogue of the MAC address learning behavior described above is used to "unlearn" MAC addresses that are to be flushed from the forwarding tables. The L2 manager process sends an IPC message to L2 table agents in all line cards, instructing them to each remove their entry for a specified MAC address. Line cards on the local chassis will flush the MAC address for the actual egress port. Line cards on each remote chassis will flush the MAC address for the stacking port.

To flush all entries on a specific port, the L2 manager process sends a single IPC command to the line cards on the local chassis. To flush the entries for a specific port on another physical chassis, at least two alternatives exist, since the remote chassis links the MAC addresses on a remote port not to that port but to the stacking port. The first approach flushes all MAC addresses on the stacking ports. This can be costly to the system and the network if flushes occur frequently, since the entire switching table has to be relearned.

The second approach is to have the L2 manager process translate the port flush operation into a series of flush operations, explicitly flushing each MAC address on the remote chassis that is associated with the port. This approach does not affect the network, but causes more software and IPC operations. During the flush operation, there may also be a time period where the chassis local to the flushed port has flushed the MAC addresses on the port, but the remote chassis is still forwarding traffic across the stacking link for those MAC addresses while the slower, MAC-by-MAC flush is implemented. This may result in such addresses being flooded on the local chassis. The L2 master process can avoid this scenario by flushing the port on the local stacking line card after flushing operations on the remote line card are complete.

Yet another approach requires that the L2 agent process on each line card save system-wide state information for each MAC address in a local copy of the MAC table. The L2 master process issues a single IPC port flush command to each remote line card. In response, the line card L2 agent searches it local MAC table and identifies the MAC addresses learned for the remote port by system port number, and flushes them individually.

The stacking link aggregation (SLAG) is, at the port level, managed as a normal LAG. Other LAGs can exist on other port groups as well, functioning to connect the stacked chassis to other nodes. When all the ports of such a LAG exist on the same physical chassis, packets switched to this LAG from the other chassis behave much like other layer-2 switched traffic egressing on a different physical chassis than the one on which the traffic is received—the receiving chassis switches the traffic to the stacking LAG, and the egress chassis then distributes the traffic from the stacking ports to the appropriate LAG members.

Figure 16:
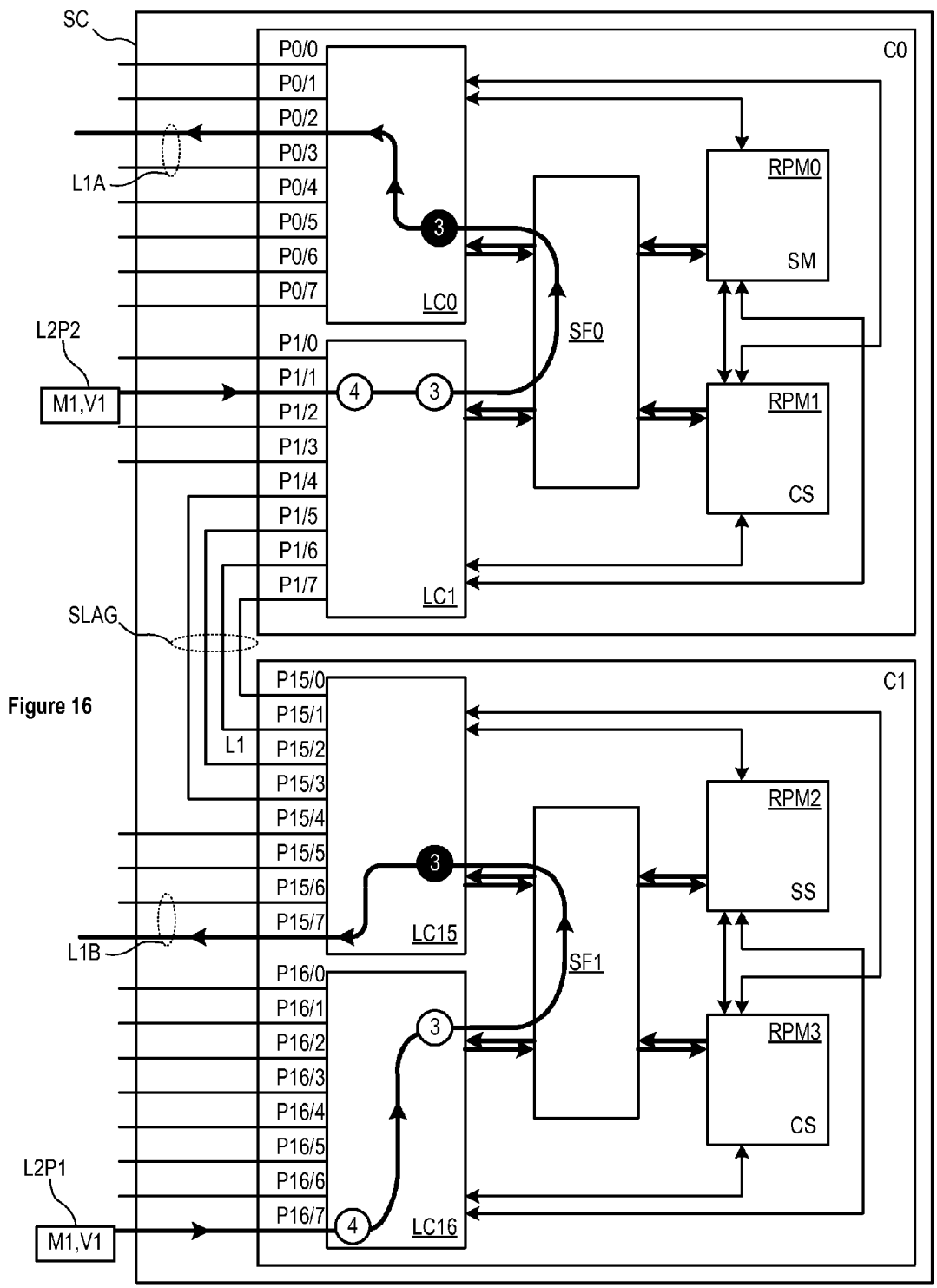

In some embodiments, LAG performance is improved by splitting a LAG across two (or more) physical chassis in a stacked system. FIG. 16 gives an example of a split LAG L1. LAG L1 comprises two aggregated ports on chassis C0 and two aggregated ports on chassis C1. On chassis C0, a LAG segment L1A occupies ports P0/2 and P0/3. On chassis C1, a LAG segment L1B occupies ports P15/6 and P15/7. Both segments connect to a four-link LAG on a peered node (not shown). To the peered node, the LAG L1 appears to be connected to a single switch, and behaves as a normal LAG. On the stacked chassis, the LAG is administered as follows.

An administrator creates a LAG, e.g., using normal command line interface commands to specify the LAG port membership. The ports are specified in system-wide port numbering, with one or more LAG ports on each chassis.

The stack manager RPM SM runs a LAG manager process. The LAG manager process assigns the LAG a LAG-ID, and uses IPC packets to instruct each line card as to the LAG ID and system-wide LAG membership, and instructs the line card to program the LAG into its hardware tables. Each line cards creates a hardware table entry for the LAG ID, listing each LAG port that exists on the local chassis using chassis port numbering.

When a given VLAN includes a multi-chassis LAG, the flooding entry for that VLAN is modified as well. Each flooding entry is programmed with a multicast group ID describing the flooding port membership for that chassis. On each chassis, when a split LAG is a member of a VLAN, one of the local LAG ports is added to the flooding multicast group ID for that VLAN. A caveat applies to the flooding entry applied to the stacking ports, however.

On each stacking line card, the hardware table programming is modified when active LAG ports for a LAG ID exist on both chassis. The hardware programming in this case is set so that any packet arriving on the stacking port cannot be forwarded to the LAG members on the current chassis. In other words, according to the behavior programmed in the preceding paragraphs, it is expected that when a chassis has a local LAG member port available, it will forward traffic on the local LAG member port rather than switch the traffic across the stacking LAG to be forwarded on a remote LAG member port. A given flooded packet may still need to be copied across the stacking LAG to reach remote VLAN member ports, but one of those ports will not be a LAG port in this special case. Thus the stacking line card may need to program two different flooding entries for a VLAN: the first applies when a packet received on a regular VLAN port requires flooding, and includes a local LAG port; the second applies when a packet received on the stacking port requires flooding, and excludes all of the local LAG ports.

When a MAC address M1 is learned on a LAG in one chassis, MAC learning happens as follows. Suppose a packet with a new MAC address, VLAN ID pair M1, V1 arrives at port P15/7 on chassis C1. Since LC15 does not know the MAC address, it learns it, enters it into its L2 forwarding table, and sends an IPC learn message to the stack master RPM. The stack master RPM distributes the learned association between LAG L1 and (M1, V1) to all line cards. Each line card checks whether active LAG L1 ports exist on the local chassis. When at least one such active LAG port exists, a MAC table entry is created setting the egress port for (M1, V1) to the LAG ID. Otherwise, the MAC table entry that is created sets the egress port for (M1, V1) to the stacking LAG ID.

The forwarding behavior for the learned address (M1, V1) is illustrated in FIG. 16. A packet L2P1 arrives at port P16/7 on chassis C1, with a destination address (M1, V1). Line card LC16 performs a layer 2 lookup (4), which identifies LAG ID L1 as the egress port. A hashing function over selected header fields selects one of the local L1 ports, P15/7, as the egress port. Line card LC16 creates (3) a backplane header specifying the egress line card and port, and queues packet L2P1 for switching across switch fabric SF1. Subsequently, the packet is switched through to line card LC15. Line card LC15 reads and strips the backplane header, and forwards packet L2P1 out LAG L1 member port P15/7.

Also, a second packet L2P2 arrives at port P1/1 on chassis C0, with the same destination address (M1, V1). Line card LC1 performs a layer 2 lookup (4), which identifies LAG ID L1 as the egress port. A hashing function over selected header fields selects one of the local L1 ports, P0/2, as the egress port. Line card LC1 creates (3) a backplane header specifying the egress line card and port, and queues packet L2P2 for switching across switch fabric SF0. Subsequently, the packet is switched through to line card LC0. Line card LC0 reads and strips the backplane header, and forwards packet L2P2 out LAG L1 member port P0/2. Thus due to the described programming, traffic arriving at each physical chassis and destined for a split LAG will egress on the same chassis.

Figure 17:
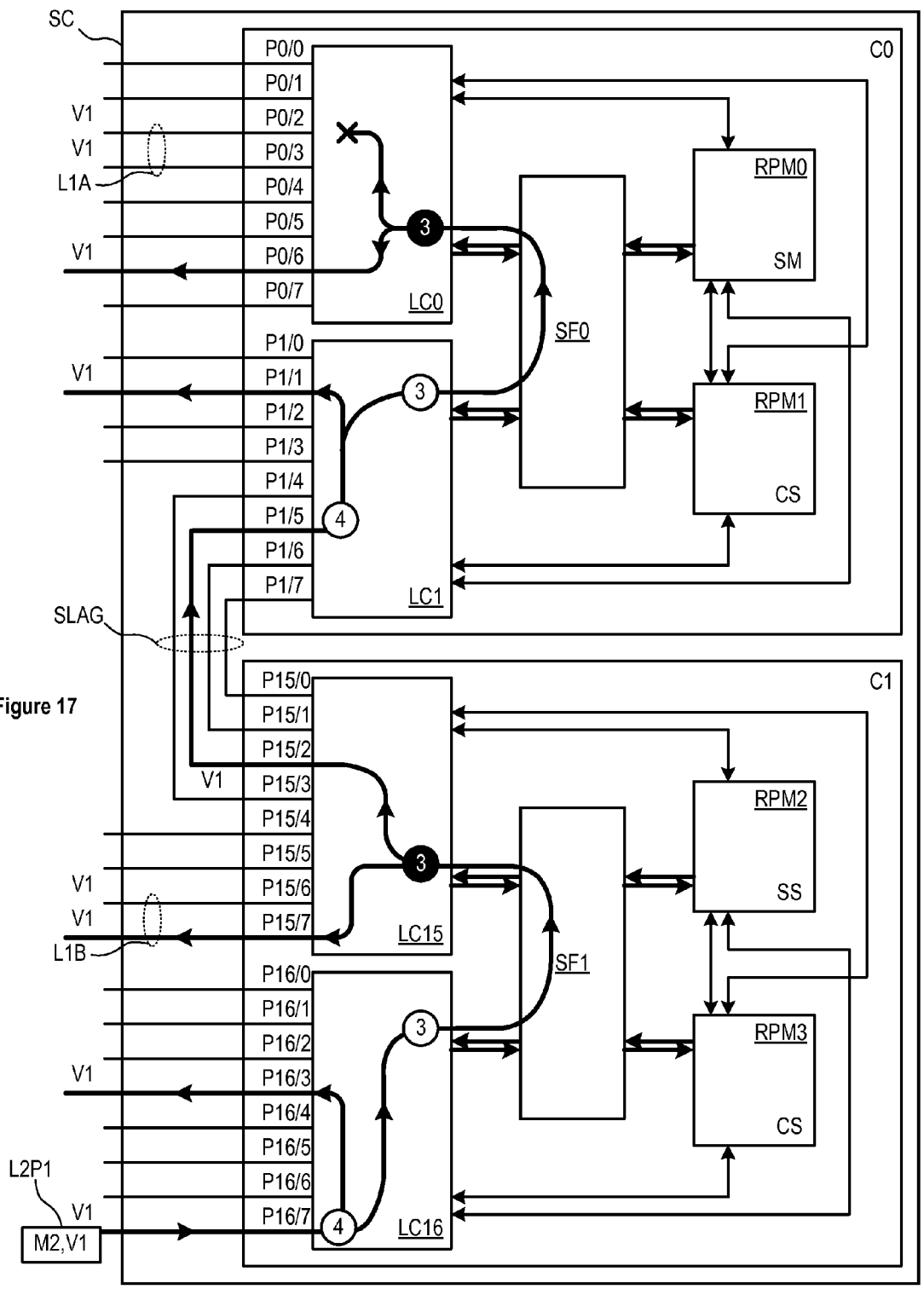

FIG. 17 illustrates a flooding example for a VLAN V1. The VLAN V1 member ports include LAG L1 (split across LC0 on chassis C0 and LC15 on chassis C1), port P0/6 on LC0, port P1/1 on LC1, and ports P16/3 and P16/7 on LC16. Like in prior examples, because VLAN V1 comprises ports on both physical chassis, the stacking LAG SLAG is also programmed on each chassis as a member port.

A packet L2P1 arrives at port P16/7, with an unknown destination address M2. Line card LC16 performs a hardware lookup on the L2 table, which fails to hit a specific egress port entry, causing it to hit the flooding entry instead. The flooding entry for V1 includes a multicast group ID and EPI that includes ports P15/2 (a stacking port), P15/7 (a LAG L1 port), local port P16/3, and local port P16/7 (which is blocked as the ingress port). The packet processor sends one copy of packet L2P1 out port P16/3, and forms another copy with a backplane header (3) including the MGID and EPI programmed for VLAN V1. The second copy is switched through SF1 to LC15 (and any other local line cards, not shown, having V1 ports).

When packet L2P1 arrives at LC15, the backplane header is read and stripped (3). The MGID and EPI instruct the LC15 packet processor to send one copy of L2P1 out LAG L1 port P15/7 and another copy of L2P1 out stacking LAG port P15/2.

The copy of L2P1 sent across the stacking link arrives at LC1 on chassis C0. The packet processor on LC1 performs a layer 2 hardware lookup (4) Like on LC16, the lookup fails to hit a specific egress port entry, and instead hits a flooding entry. The stacking card, however, has two flooding entries for V1, and the hit occurs on the one having a stacking ingress port. The returned MGID and EPI include local port P1/1 and line card LC0 port P0/6. Had the packet arrived instead, e.g., at port P1/1, a different EPI (same MGID in this case) would have also included the stacking port and one of the local LAG L1 ports. The result of the lookup is a flooding process much like that described for the LC16 lookup, except with the chassis C0-specific MGID and EPI. (Note in our current implementation we are not planning on using two different EPI as mentioned here, rather we are planning to use the Egress ACL feature to block packets ingressing on the stacking link to egress out of the multi-chassis LAG. Should we update the document to reflect this, or leave the description as it is, which is another way of doing the same thing)

For a split LAG, several new tasks are performed when a LAG member link goes down. Each line card is notified of the change in LAG membership. When the down port is on the same chassis as a line card, the line card modifies its hardware LAG table to remove the port from the entry for that LAG ID, and decreases the hardware port membership total by 1. When at least one active local port remains, the line card checks whether the port going down was included in a MGID/EPI for the affected VLAN. If so, the line card modifies its MGID/EPI table to resolve to a different local LAG port. When no local LAG ports remain, however, the hardware LAG ID entry is deleted, and the MGID/EPI for the affected VLAN is modified to remove the LAG port.

When the local port going down is the last local LAG port, the chassis must also decide what to do with the learned MAC addresses that identified the LAG ID as their egress port. When the remote chassis also has no active LAG ports, the local chassis simply removes all MAC addresses learned for the MAC ID. When the remote chassis has at least one remaining LAG port, the L2 hardware tables in the local chassis are reprogrammed such that the entries previously pointing to a local LAG port now point to a stacking port.

Remote line cards are also notified when a LAG member port goes down. On the stacking line card, a check is performed as to whether any active LAG member ports remain on the remote chassis. If not, and an active LAG member port remains on the local chassis, the block on the stacking link that suppresses packets destined for a LAG member port is removed. When no active LAG member port remains on either chassis, the line cards on the remote chassis also remove all MAC addresses learned for the MAC ID.

In addition to LAG ports going down, a stacked chassis employing split LAGs must also handles LAG ports coming up on split LAGs. When a LAG port on a local line card comes up, the corresponding LAG ID entry in the LAG table is updated to add the port. If this is the first local port on the LAG, the port is added to the multicast group ID for the flooding VLAN entry for the VLAN including the LAG. Also, when the port is the first local LAG port, each local line card will move all MAC addresses learned on the LAG from the stacking port to the activating LAG port. Finally, in this case, when a remote LAG port is active, the stacking port block is activated to prevent packets ingressing on the stacking port from egressing on the local LAG port.

When a LAG port on a remote line card comes up, nothing changes on the other chassis unless this is the first port up for that LAG on the remote chassis. If this is the first port up, however, then the other chassis stacking line card institutes a block to prevent LAG packets from the other chassis from egressing on a LAG port in this chassis.

When LAG ports leave and enter on a given chassis, this can result in the necessity to move a large number of hardware table references to the LAG between the stacking port and the LAG ID. To make this operation more efficient, each line card can save structures to help it quickly locate the entries that need to be switched between the stacking port and a local LAG table entry. For instance, a double-linked list can either be stored in a RAM copy of the hardware table entries, or alongside the hardware table entries, allowing the line card processor to quickly traverse the list of affected entries and modify the entries.

Layer 2 multicast operations are handled in a similar fashion to the flooding illustration of FIG. 17, with the Multicast MAC address programmed into the L2 table with an MGID for the group serving as the egress port. Each MGID is distributed to all line cards with a list of all ports on all chassis that belong to the group. When the hardware tables are configured on each chassis, however, the ports programmed include only the multicast ports on that chassis and the stacking port. Split LAGs that are members are handled like in the previous example, with blocking on the egress side of the stacking link and one LAG port on each chassis explicitly programmed on that chassis as a MGID member.

Layer 3 operations across a stacked platform according to an embodiment should also be transparent to peer nodes. With layer 2 switching as described above, having both stacked chassis switch the packet in tandem is transparent to peer devices. The same cannot be said of Layer 3 routing. Due to the fact that a Time-To-Live field in an L3 header decrements each time a routing operation is performed, and the fact that each hop in the route terminates a Layer 2 path, undesirable and potentially confusing artifacts could result from having two chassis perform routing operations in parallel. Accordingly, the preferred implementation performs a routing operation at the ingress chassis and, when the next hop port is on a different chassis, performs a switching operation on the second chassis.

Address Resolution Protocol (ARP) requests and replies can be processed by any line card in a stacked system. An ARP request arriving at a given VLAN port will include the sender's MAC address, which is learned and entered in the L2 table on all line cards in the stacked chassis, as has been described above for L2 processing. The ARP request is also sent to the stack master RPM, which formulates an ARP reply and sends it back out the port that received the ARP request.

When the stacked chassis needs to know a delivery address on a given VLAN, it generates an ARP request and sends the request to the VLAN membership. A returned ARP reply includes both L2 and L3 address information for the targeted device. Each line card in the stacked chassis is instructed to program the L2 and L3 information into its hardware tables.

Figure 18:
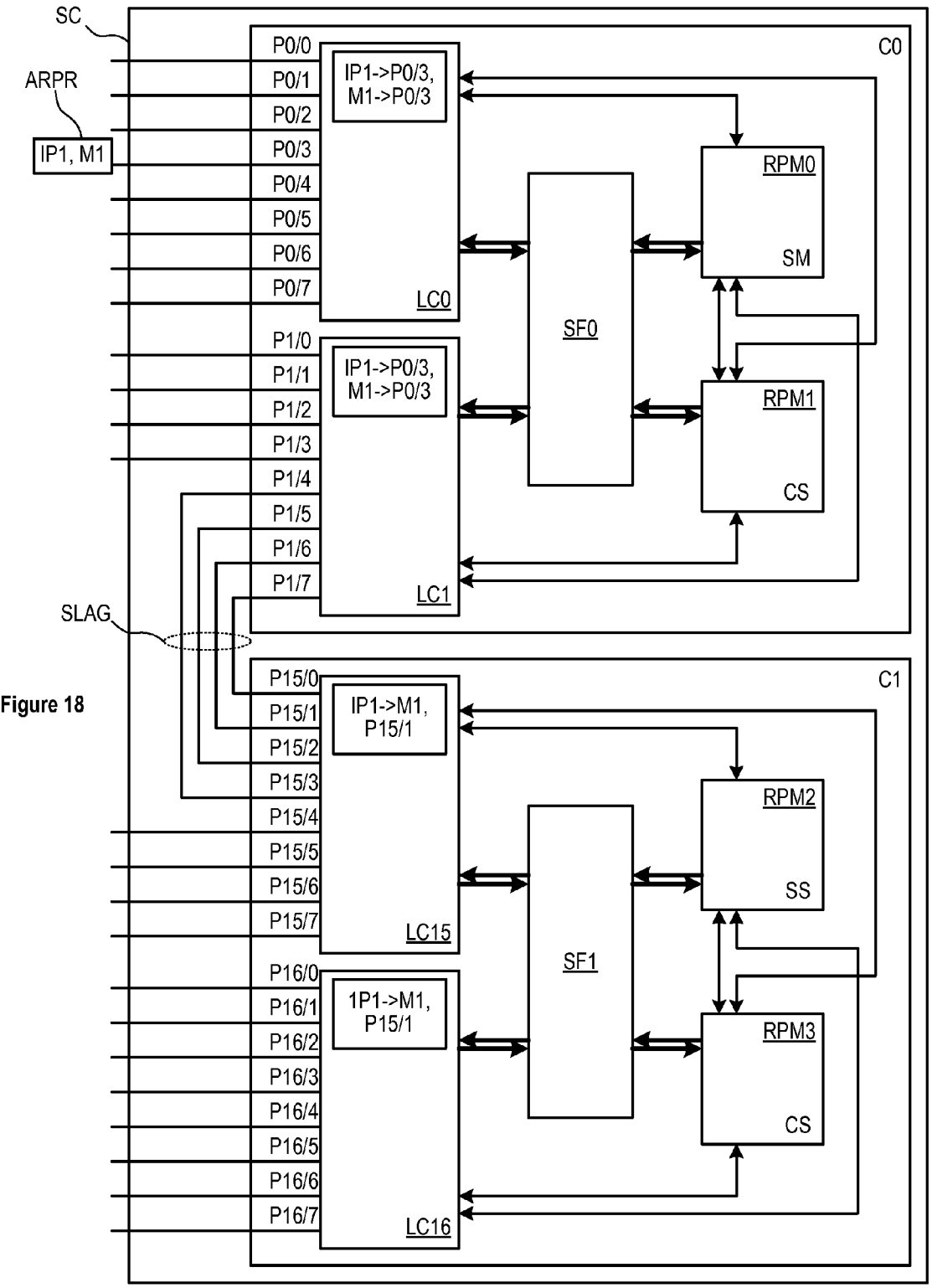

FIG. 18 shows an example. An ARP reply packet ARPR is received at port P0/3, with an IP address IP1 and a next-hop MAC address M1. Each line card is instructed to make appropriate L3 and L2 entries for the reported system-wide port P0/3, IP1, and M1. The L3 entry associates the IP address IP1 with the next-hop port and the L2 header changes to be performed, including substituting the received chassis SC MAC DA with MAC DA M1 and decrementing the TTL. On line cards that are local to port P0/3, the next-hop port in the L3 entry is set to P0/3. On line cards that are remote to port P0/3, the next-hop port in the L3 entry is set to one of the stacking ports, e.g., port P15/1. The L2 entries are set similarly, e.g., associating M1 with P0/3 on the local chassis and with a stacking port on the remote chassis.

Figure 19:
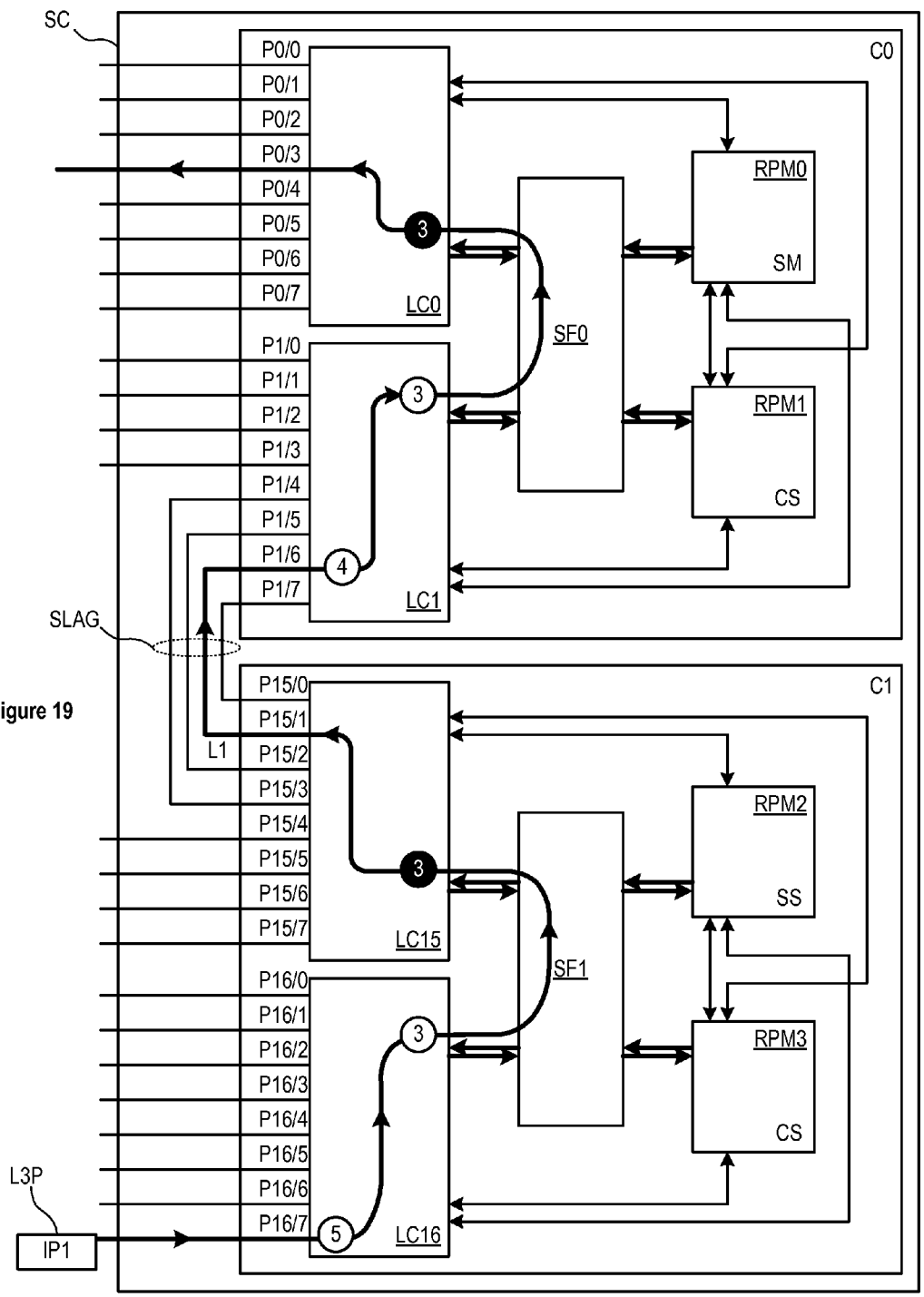

FIG. 19 shows the result of the above programming for a routed packet L3P with a destination IP address IP1, received on port P16/7 of chassis C1. The received packet has a MAC DA assigned to SC, causing line card LC16 to perform an L3 lookup and processing operation (5). The lookup returns a next-hop port P15/1 and a destination MAC address M1. The L2 header is changed to substitute for chassis SC's MAC DA the next-hop MAC DA M1, the TTL is modified, and any other appropriate L2 header changes are performed. A backplane header (3) is added to L3P, indicating egress port P15/1 and line card LC15 in chassis port notation, and the packet is queued for transmission across SF1. Subsequently, packet L3P is switched across SF1 to LC15, where the backplane header is removed (3) and the packet is sent out port P15/1.

When packet L3P arrives at stacking port P1/6 on line card LC1, the packet MAC DA M1 is one that can be resolved by an L2 lookup (4). The L2 lookup returns an egress port P0/3. The packet is transmitted normally through the C0 backplane to LC0 and out port P0/3.

When a routed packet arrives at the same chassis that serves the egress port, the initial L3 lookup resolves the packet's true egress port, and no second switching operation is required. Thus the overall behavior of the stacked chassis is that only the ingress chassis performs an L3 lookup and processing, and sets the L2 header so that when the egress chassis is different than the ingress chassis, only an L2 switching operation is required at the second chassis.

Proper operation of this approach requires that the L3 and L2 entries remain valid for the same time. Since ARP entries can age from the L3 table and MAC entries can be flushed from the L2 table, it is possible that a conflict could arise between the L2 and L3 information needed to route packets through the stacked chassis. One way to avoid this is to mark as static the L2 table entries associated with an ARP response, so that the L2 table entries remain valid. Should the ARP entry age, when it is removed from the L3 table the corresponding static L2 entry can be removed as well.

In an alternative implementation, during L3 processing the next-hop port is not taken from the L3 table. Instead, the egress MAC in the L3 table is used to perform a lookup on the L2 table, which returns the current L2 egress port. This approach allows IP packets to follow movement in the destination station. Should the L2 lookup fail to hit an entry (e.g., because the L2 entry has been flushed), the L3 entry can be aged out to prevent misdelivery, flooding, or extended packet dropping for the IP address.

When the egress port for L3 traffic is a LAG that is split across two physical chassis in the stack, the L3 table entries can resolve the egress port to a local LAG member when one is available.

A stacked chassis can also be expected to perform L3 multicast operations across the stack. To support stack-wide L3 multicast, the stacking port is included as a member of all multicast groups. Each member of a multicast group is allowed to be marked as an L2 member or an L3 member— the stacking port is marked as an L2 member, such that L3 processing is not performed on the copy of a multicast packet that is passed to the stacking port. All line cards are informed of the MGID and EPI for the entire multicast group, with a description of all ports on all chassis that are part of the group. Each line card programs a local L3 flow table with the MGID and EPI, and programs the hardware MGID/EPI table with all ports in the local chassis, including the stacking port.

Figure 20:
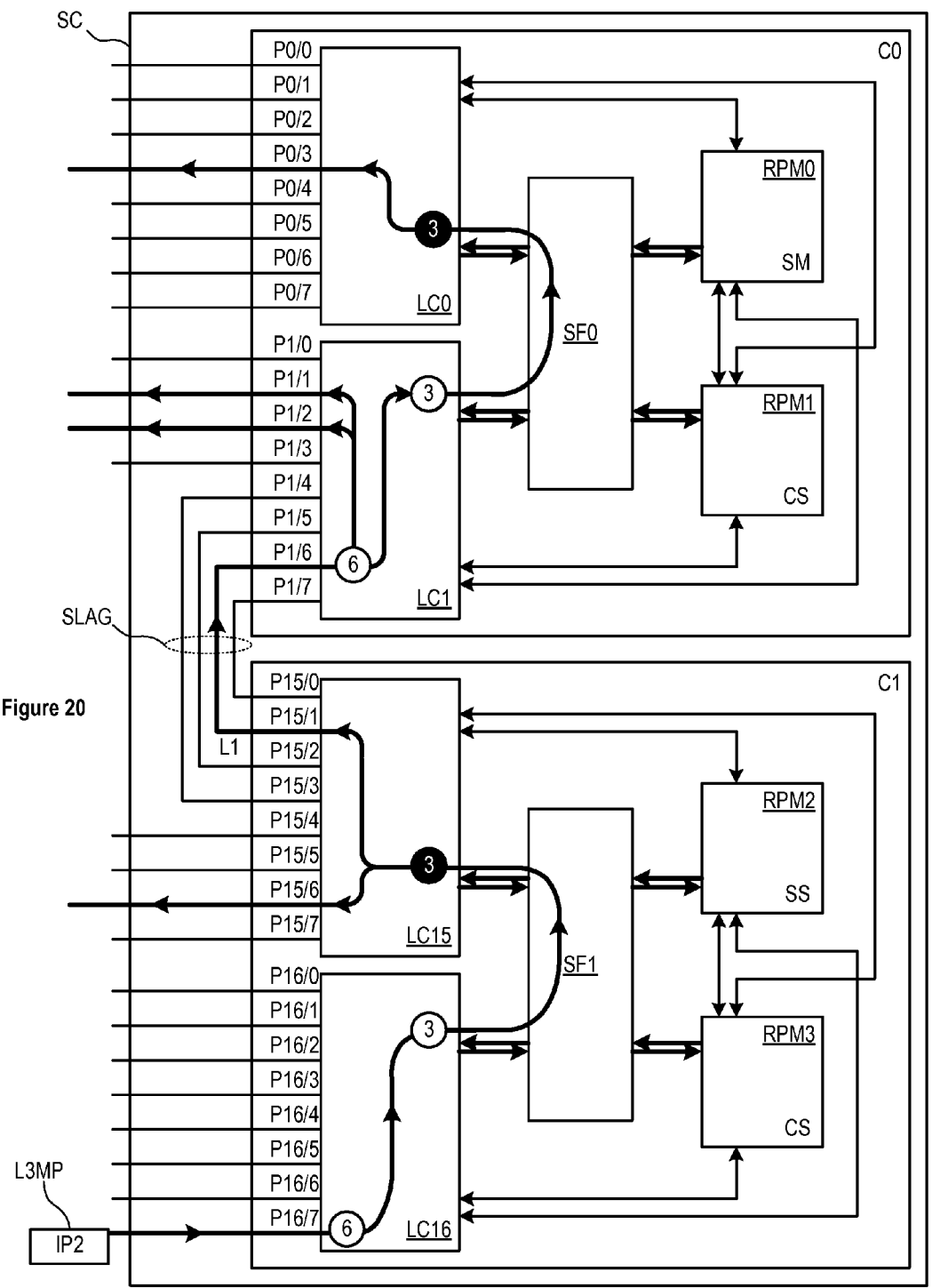
FIG. 20 illustrates L3 multicast of a packet across both chassis.

FIG. 20 shows a multicast example for a multicast packet L3MP received at port P16/7 on chassis C1. The destination multicast IP address causes line card LC16 to perform a lookup on the L3 flow table (6), which returns the MGID/EPI and local port association. In this example, the MGID/EPI indicates two ports, both located on LC15. The MGID/EPI are included in a backplane header (3), and the packet is multicast across SF1 to LC15 (and any other line cards associated with the multicast group). When the packet reaches LC15, the backplane header is read and stripped (3). The EPI instructs the line card to make two copies of packet L3MP: the first has L3 processing completed and is addressed for forwarding out port P15/6; the second does not have L3 processing completed, and is forwarded out stacking port P15/1 unchanged (although a VLAN header may be added if the original packet had no VLAN header).

When the stacking link copy of L3MP arrives at LC1, a second L3 flow table lookup (6) returns the appropriate MGID/EPI for the multicast packet. Chassis C0, however, has installed a port list for the MGID/EPI combination appropriate for that chassis. Each port in the list receives its own copy of the multicast packet, L3 processed if appropriate.

Figure 21:
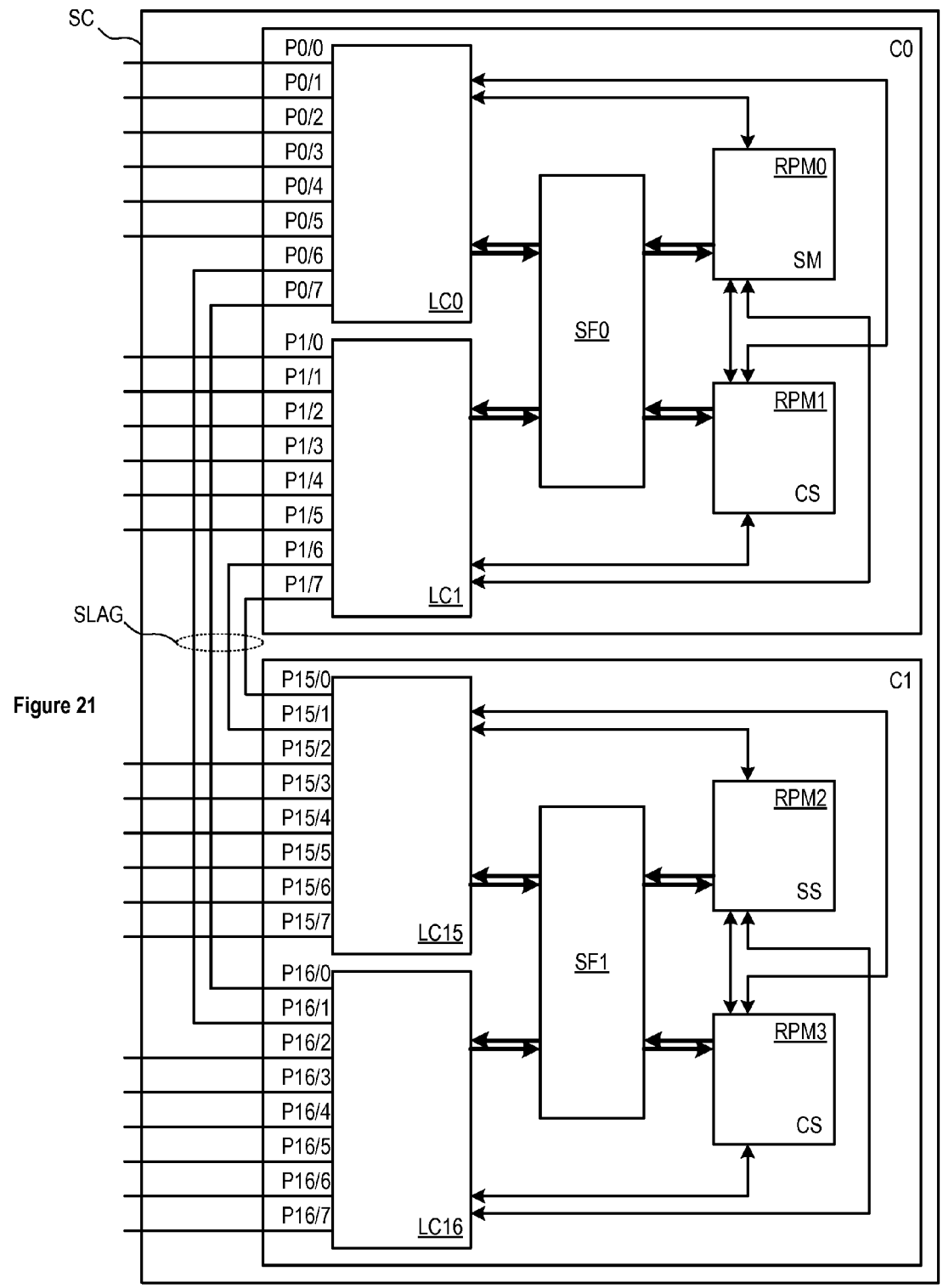
FIG. 21 shows an alternate stacking arrangement with the stacking ports apportioned across multiple line cards on each chassis.

Although the prior embodiments illustrate a stacking LAG that uses front-end ports on the same line card at each end, this is not the only possibility. FIG. 21 illustrates an alternate embodiment in which the stacking LAG ports are distributed on two line cards on each chassis. Operation is similar to the prior embodiments, except each line card has multiple choices as to which stacking line card to use for sending traffic to the other chassis. By definition, each stacking line card will always use its own stacking ports to communicate with the other chassis. Thus when a stacking line card gets a packet from another stacking line card that would ordinarily be flooded or multicast across the stacking LAG, the packet is blocked from egressing on the second line card's stacking ports.

Figure 22:
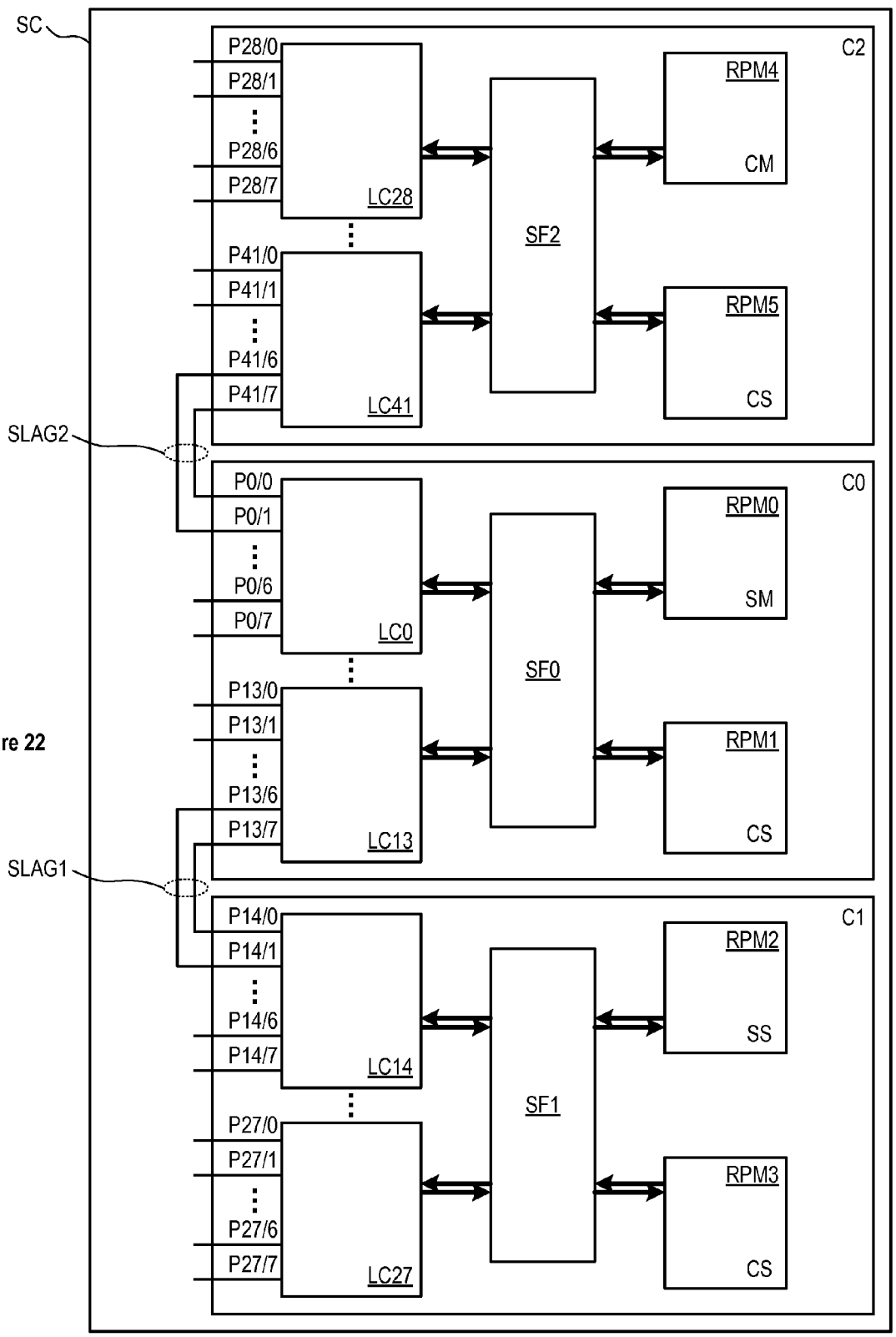
FIGS. 22 and 23 show embodiments with three physical chassis stacked in a logical chassis.

The prior embodiments have been limited for clarity of description to involve only two physical chassis. The described concepts are readily applicable to larger stacks, e.g., the stacked chassis SC of FIG. 22, which connects three physical chassis C0, C1, and C2 through front-end ports. In FIG. 22, RPM0 on chassis C0 is elected stack master SM, RPM0 on chassis C1 is elected stack slave SS, and the RPMs on chassis C2 do not assume a stack management duty.

Two stacking LAGs, SLAG1 and SLAG2, connect the three chassis together. SLAG1 connects two ports on line card LC13, chassis C0 to two ports on line card LC14, chassis C1. SLAG2 connects two ports on line card LC0, chassis C0 to two ports on line card LC41, chassis C2. For chassis C1, it need not differentiate between remote chassis C0 and C2 when passing or receiving traffic with a stack peer—all such traffic is sent and received on SLAG1. Likewise for chassis C2, all traffic to either stack peer passes across SLAG2. Chassis C0, however, must correctly associate traffic with either SLAG1 or SLAG2, depending on the desired destination. Chassis C0 also may have flooding/multicast entries that include both the SLAG1 and SLAG2 stacking ports.

Once configured, the three-switch stack largely operates similar to the two-switch stack described above. The major difference is that switch C0 will have to pass some traffic between its two stacking LAGs.

Figure 23:
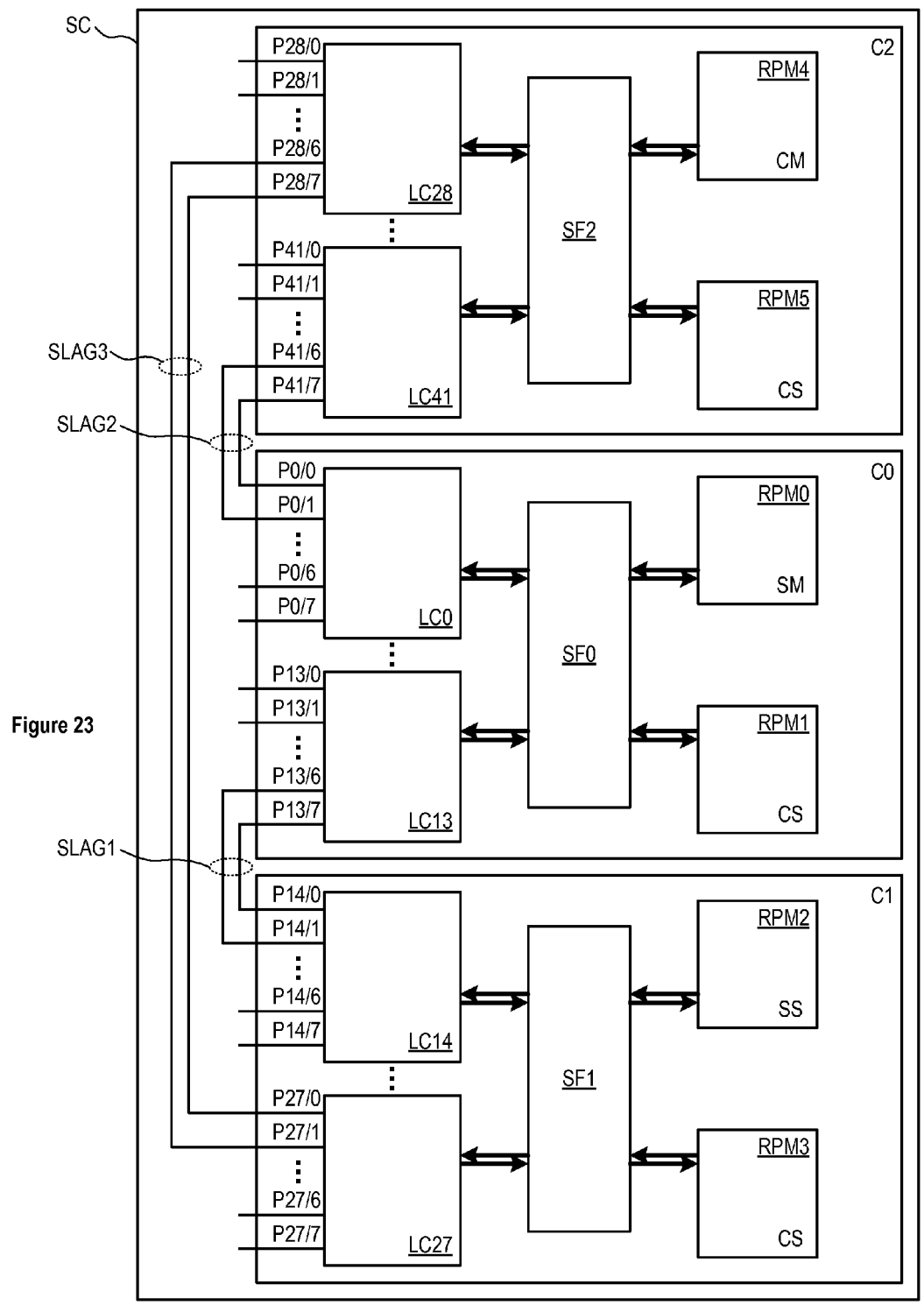

FIG. 23 shows the three-switch stacking configuration of FIG. 22, augmented with a third stacking LAG SLAG3. This third stacking LAG connects front end ports on line card LC27, chassis C1 to front end ports on line card LC28, chassis C2. This configuration avoids "pass-through" stack traffic on C0, as C1 and C2 can now pass stacking traffic directly between themselves. Each switch must now keep track of two stacking LAGs and transmit stacking traffic on the appropriate LAG. When one switch receives a packet on one of its stacking LAG ports that has an egress port on a remote chassis, that packet is blocked from being sent on another stacking LAG, as it is assumed that the originating chassis will use its direct stacking LAG link to send a copy to that egress port.

Although several embodiments and alternative implementations have been described, many other modifications and implementation techniques will be apparent to those skilled in the art upon reading this disclosure. For instance, other methods can be used to distribute IPC traffic, including programming the hardware packet processors to interpret stacking headers, thereby decreasing the load on line card CPUs. The master RPM on each slave chassis can also be used to distribute and collect IPC traffic from that chassis' line cards, under the control of the master RPM. L3 unicast operations can alternately be implemented such that an ingress chassis does not perform L3 processing on a packet passed to the stacking port, with the egress chassis expected to perform the processing. Many other similar modifications to the exemplary embodiments exist and fall within the scope of the application.

Although the specification may refer to "an", "one", "another", or "some" embodiment(s) in several locations, this does not necessarily mean that each such reference is to the same embodiment(s), or that the feature only applies to a single embodiment.

What is claimed is:

1. A method for forwarding a packet through a logical chassis, the method comprising:
receiving a packet at a first ingress port on a first physical chassis;
using information in the packet to identify a destination for the packet;
initiating a MAC address learning operation when the packet is received at the first ingress port;
assigning the packet for forwarding by a stacked link aggregation group (SLAG) based on information associated with the destination;
routing the packet to the SLAG;
selecting a first egress port based on at least information associated with the packet, the first egress port being assigned to the SLAG;
transmitting the packet over the first egress port;
receiving the transmitted packet at a second ingress port on a second physical chassis;
selecting a second egress port using information associated with the destination, the second egress port being on the second physical chassis; and
transmitting the packet over the second egress port;
wherein:
the second physical chassis is different from the first physical chassis;
MAC address learning is disabled on the second ingress port; and
no MAC address learning operation is initiated when the transmitted packet is received at the second ingress port.

2. The method of claim 1 wherein the first physical chassis and the second physical chassis are configured in a stacked chassis relationship.

3. The method of claim 2 wherein the first physical chassis and the second physical chassis are packet network devices.

4. The method of claim 3 wherein each of the packet network devices is a network router or a network switch or both a network router and a network switch.

5. The method of claim 1 wherein the packet is a network layer-3 packet.

6. The method of claim 1 wherein the information used to identify a destination includes Internet Protocol (IP) destination address information.

7. The method of claim 1 wherein the second ingress port is assigned to the SLAG.

8. The method of claim 1 wherein the information used to identify a destination includes MAC destination address information.

9. The method of claim 1 wherein the packet is an IP packet.

10. The method of claim 1 wherein the MAC address learning operation comprises transmitting an InterProcess Communication message from the first chassis to the second chassis.

11. A logical chassis for forwarding a packet, the chassis comprising:
a first physical chassis including a first ingress port, a first egress port, a first packet processor, and a first switching network, the first egress port being assigned to a stacked link aggregation group (SLAG); and
a second physical chassis including a second ingress port, a second egress port, a second packet processor, and a second switching network, the second ingress port being coupled to the first egress port;
wherein the first packet processor is configured to:
examine a packet received at the first ingress port to identify a destination for the packet;
initiate a MAC address learning operation when the packet is received at the first ingress port;
assign the packet for forwarding by the SLAG based on information associated with the destination; and
route the packet to the SLAG over the first switching network;
wherein the SLAG is configured to transmit the packet over the first egress port based on at least information associated with the packet;
wherein the second packet processor is configured to:
examine the packet received at the second ingress port; and
route the packet to the second egress port over the second switching network for transmission over the second egress port;
wherein MAC address learning is disabled on the second ingress port and no MAC address learning operation is initiated when the transmitted packet is received at the second ingress port.

12. The logical chassis of claim 11 wherein the first physical chassis and the second physical chassis are configured in a stacked relationship.

13. The logical chassis of claim 12 wherein the first physical chassis and the second physical chassis are packet network devices.

14. The logical chassis of claim 13 wherein each of the packet network devices is a router or a switch or both a router and a switch.

15. The logical chassis of claim 11 wherein the second ingress port is assigned to the SLAG.

16. The logical chassis of claim 11 wherein:
the packet processor includes a packet scheduler; and
the packet processor is located.

17. The logical chassis of claim 11 wherein the first physical chassis and the second physical chassis each include one or more line cards.

18. The logical chassis of claim 11 wherein the MAC address learning operation comprises transmitting an Inter-Process Communication message from the first chassis to the second chassis.

* * * * *